United States Patent [19]
Brett et al.

[11] Patent Number: 5,042,596
[45] Date of Patent: Aug. 27, 1991

[54] IMBALANCE COMPENSATED DRILL BIT

[75] Inventors: J. Ford Brett, Tulsa; Tommy M. Warren, Coweta, both of Okla.

[73] Assignee: Amoco Corporation, Chicago, Ill.

[21] Appl. No.: 551,666

[22] Filed: Jul. 12, 1990

Related U.S. Application Data

[63] Continuation of Ser. No. 313,126, Feb. 21, 1989, abandoned.

[51] Int. Cl.5 ................... E21B 7/10; E21B 10/00; E21B 10/46
[52] U.S. Cl. ................... 175/57; 175/329; 175/399; 175/408
[58] Field of Search .......... 175/398, 399, 376, 409, 175/410, 413, 57, 406, 408

[56] References Cited

U.S. PATENT DOCUMENTS

| | | | |
|---|---|---|---|
| 1,463,566 | 7/1923 | Akins | 175/389 |
| 3,163,243 | 12/1964 | Cleary | 175/399 |
| 3,629,558 | 12/1971 | Coggin | 235/151.1 |
| 3,751,177 | 8/1973 | Faber | 175/408 X |
| 3,851,719 | 12/1974 | Thompson et al. | 175/406 |
| 3,966,349 | 6/1976 | Osman et al. | 408/204 |
| 4,545,441 | 10/1985 | Williamson | 175/329 |
| 4,549,614 | 10/1985 | Kaalstad et al. | 175/339 |
| 4,641,718 | 2/1987 | Bengtsson | 175/331 |
| 4,753,305 | 6/1988 | Fisher | 175/410 |
| 4,790,397 | 12/1988 | Kaalstad et al. | 175/376 X |

OTHER PUBLICATIONS

Brett et al., "Bit Whirl: A New Theory of PDC Bit Failure", SPE 19571, Oct. 1989.
Osman et al., "On the Development of Multi-Edge Cutting Tools for BTA Deep-Hole Machining"; Journal of Engineering for Industry, May 1976, pp. 474-480.

Primary Examiner—Hoang C. Dang
Attorney, Agent, or Firm—Finnegan, Henderson, Farabow, Garrett & Dunner

[57] ABSTRACT

An imbalance compensated drill bit is disclosed that takes advantage of undesired and destructive imbalance forces to prevent bit whirl. Methods of designing and making such imbalance compensated drill bits are disclosed whereby a drill bit body has at least one cutting zone with a plurality of cutting elements extending therefrom and at least one bearing zone. The bearing zone has a relatively smooth surface and is located at a position where the net imbalance force (from the cutting elements) is directed towards. When the drill bit is rotated, the imbalance force presses the bearing zone against the borehole wall, and the bearing zone slips along the wall, thereby preventing the center of rotation to shift and create the destructive whirling motion.

12 Claims, 21 Drawing Sheets

IMBALANCE COMPENSATED DRILL BIT

This application is a continuation of application Ser. No. 07/313,126, filed Feb. 21, 1989, now abandoned.

BACKGROUND OF THE INVENTION

1. Field of the Invention

The present invention relates to drill bits used to create boreholes through a material and, more particularly, to such drill bits that are used in the exploration and production of hydrocarbons.

2. Setting of the Invention

In the exploration and production of hydrocarbons, a rotating drill bit is used to create a borehole through the earth's subsurface formations. The users of the drill bits and the drill bit manufacturers have found that by controlling more precisely the weight-on-bit (WOB) and increasing the rotational speed (RPM) that increased penetration rates can be achieved. However, as the RPM is increased, the drill bit effective life has decreased dramatically because the cutting elements on the drill bit become cracked and occasionally are violently torn from the bit body.

Numerous studies have been made to find out what causes such destruction to the cutting elements. The inventors hereof have previously found that a substantial portion of the destructive forces are generated by radial imbalance forces that cause the drill bit to rotate about a center offset from the geometric center of the bit body in such a way that the drill bit tends to backwards whirl about the borehole. This whirling causes the center of rotation to change dynamically as the drill bit rotates about the borehole. Thus, the cutters travel faster, side-ways and backwards and are subjected to greatly increased impact loads, thereby destroying the cutters.

More specifically, circumferential drilling imbalance forces exist to some degree on every drill bit and these forces tend to push the drill bit towards the side of the borehole. If the drill bit has a normal cutting structure, the gauge cutters are designed to cut the edge of the borehole. During the cutting process, the effective friction between the cutters near the gauge area increase and, thus, the instantaneous center of rotation becomes some point other than the geometric center of the drill bit. When this happens, the usual result is for the drill bit to begin to backwards whirl around the borehole. The whirling process regenerates itself because sufficient friction is always generated between the drill bit gauge area and the borehole wall—no matter what the orientation of the drill bit—from the centrifugal forces generated by the rapid acceleration of the drill bit.

Various methods and equipment have been proposed to eliminate or reduce these imbalance forces, including using dynamically balanced lower drillstring assemblies and realigning the cutters to reduce the imbalance forces.

SUMMARY OF THE INVENTION

The present invention has been contemplated to overcome the foregoing deficiencies and meet the needs described above. By way of the present invention, the imbalance forces existing on a drill bit are detected and measured. Modifications are made to the drill bit to not necessarily reduce the imbalance forces but to take advantage of these forces. Specifically, an existing drill bit or a yet to be completed drill bit have the imbalance forces measured using a spatial coordinate system. The unbalance forces are resolved to generate a single force direction, a point or area on the drill bit body which will always be moved towards the borehole wall. No cutters are placed in this area so that a relatively smooth bearing zone is defined. When the drill bit so modified is rotated, the unbalance forces push the bearing zone against the borehole wall but no whirling is generated because no cutters are on the bearing zone to dig into the borehole wall to create the whirling forces, i.e., the bearing zone always slides along the borehole wall.

DETAILED DESCRIPTION OF THE PREFERRED EMBODIMENT

The present invention is an imbalance compensated drill bit and related methods of making such a drill bit from beginning or from an existing drill bit. The drill bit includes a bit body interconnectable to a source of rotation that has at least one defined bearing zone on a side portion thereof and at least one defined cutting zone. A plurality of cutting elements extend from the at least one cutting zone and are arranged about a predetermined center of rotation spaced from the geometric center of the bit body. The cutting elements cause the at least one bearing zone to be pushed towards the borehole wall. Since the at least one bearing zone is relatively smooth, it slides along the borehole wall and does not dig into the subterranean material to create destructive whirling motion.

The methods of designing and thereafter building the drill bit of the present invention can be briefly summarized as follows. An array of spatial coordinates representative of selected surface points on the drill bit body and on cutters mounted thereon is created. The array is used to calculate the position of each cutting surface relative to the longitudinal axis of the bit body and a vertical reference plane which contains the longitudinal axis of the bit body is established. Coordinates defining each cutter surface are rotated about the longitudinal axis of the bit body and projected onto the reference plan thereby defining a projected cutting surface profile. In manufacturing the drill bit, a preselected number of or all of the cutters are mounted on the bit body. A model of the geometry of the bit body is generated as above described. Thereafter, the imbalance force which would occur in the bit body (under defined drilling parameters) is calculated. The imbalance force and model are used to calculate the position of an additional cutter or cutters which when mounted on the bit in the calculated position would cause the imbalance force to be directed towards the at least one defined bearing zone on the bit body. Cutters are then mounted in the position or positions so calculated. Also the drill bit can have an imbalance force designed from inception so that when the cutters are placed on the bit body the drill bit has the desired imbalance force. In the case of modifying an existing drill bit, a cutter or cutters are removed from positions so calculated to define at least one bearing zone which has the imbalance forces directed theretowards.

The following discussion will be divided into three parts: the drill bit itself, the methods of making the drill bit, and drilling test results.

Drill Bit Features

Figure 1:
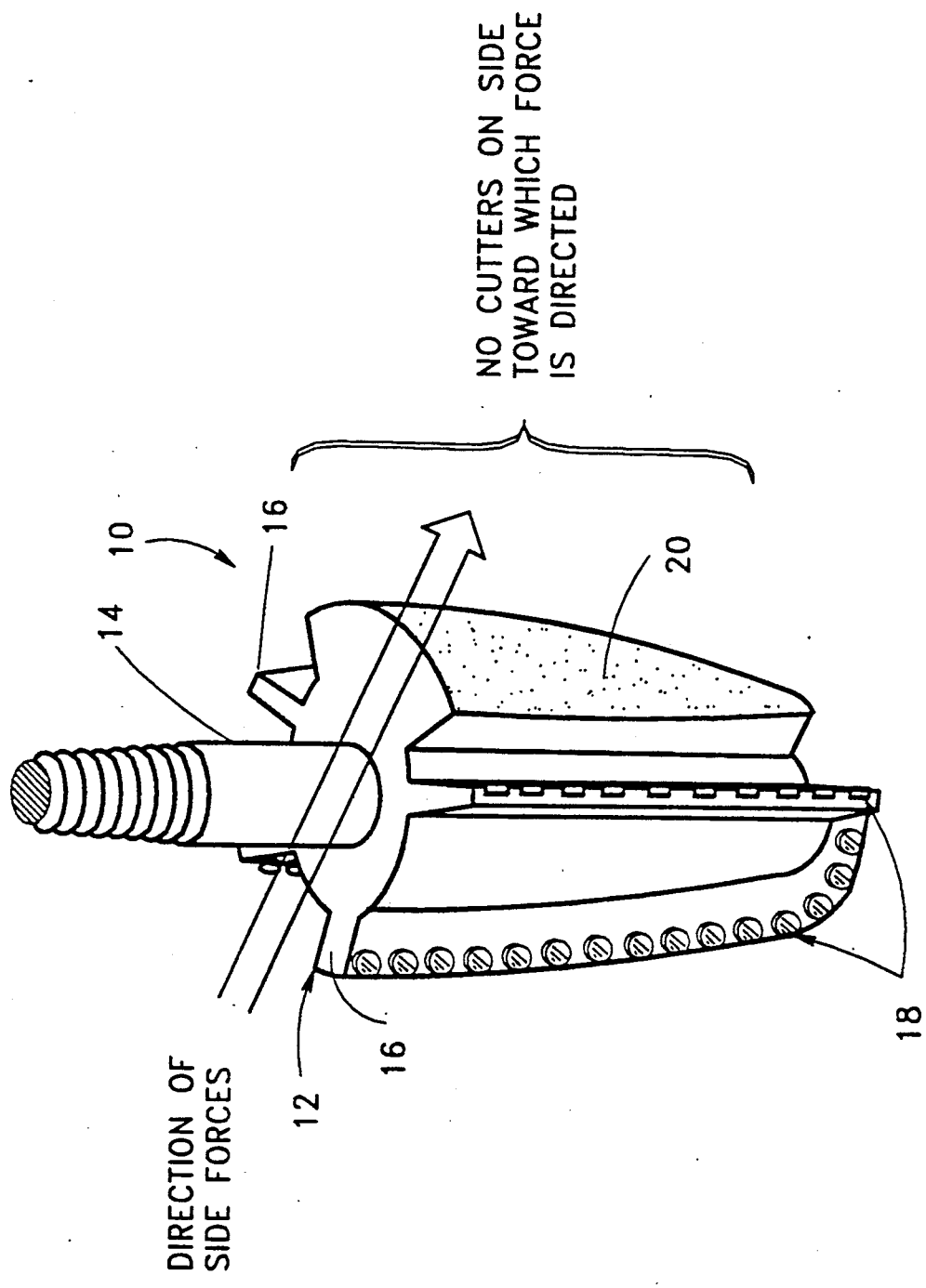
FIG. 1 is a perspective view of a drill bit embodying the present invention.
Figure 2A:
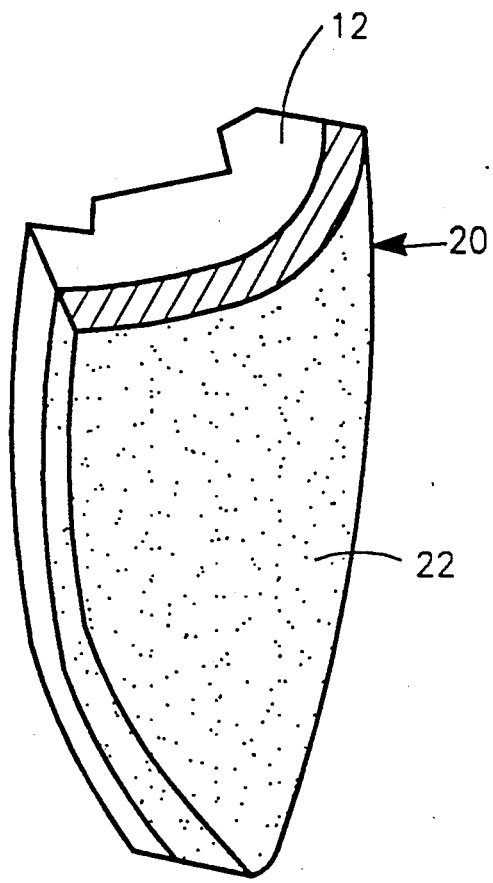
FIGS. 2A, 2B, and 2C show a perspective view of a portion of a bearing zone on a drill bit with different embodiments of wear surfaces thereon.
Figure 2B:
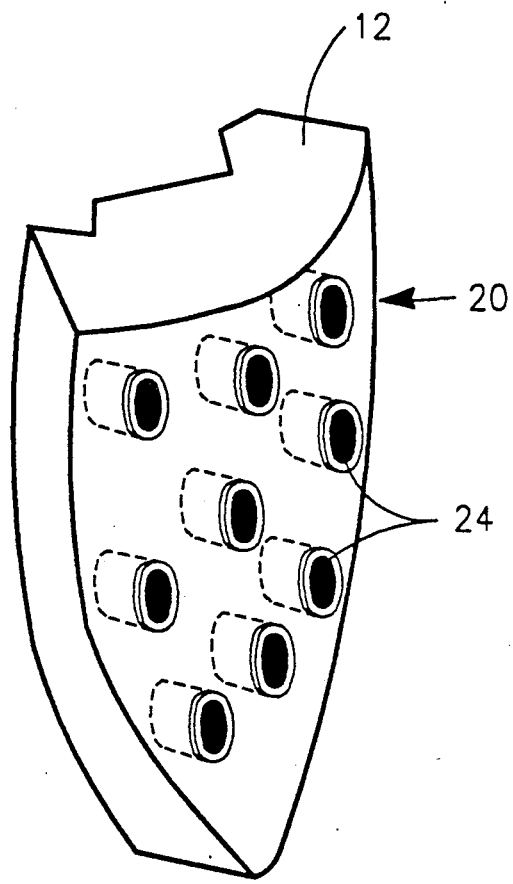
Figure 2C:
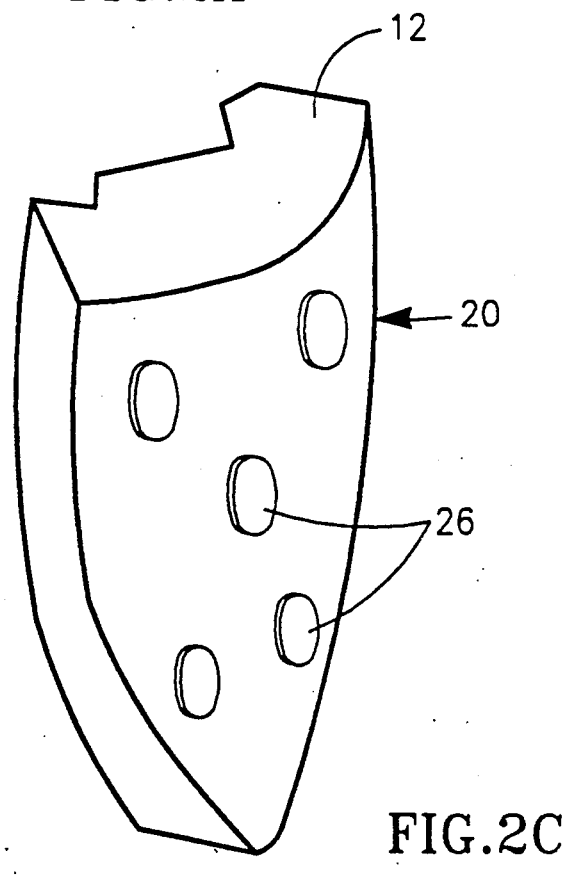

As shown in FIG. 1, a drill bit 10 includes a generally cylindrical body 12 and can be Stratapac, PDC, diamond matrix, roller cone or other similar type bit design and configuration. In the embodiment shown in FIG. 1, the body 12 includes a threaded pin shank 14 for interconnection with a source of rotation, such as a downhole motor, or rotating drillstring, as is well known. In one embodiment, a plurality of cutting blade members 16 extend from the body 12 and include a plurality of cutting elements 18 mounted thereon in any conventional manner. The blades 16 and cutters 18 define at least one cutting zone of the bit body 12. At least one relatively smooth, hardened pad area 20 is provided on, and can extend from, the bit body 12 towards which the net imbalance forces are directed. The pad area 20 can, as shown in FIGS. 2A, 2B and 2C, include a wear coating 22, a plurality of diamond stud inserts 24 or thin diamond pads 26. Further, the pad area 20 is preferably of sufficient surface area so that as the pad area 20 is forced against the borehole wall, the applied force per square inch will be much less than the compressive strength of the subsurface material. This preferable requirement is to keep the pad area 20 from digging into and crushing the borehole wall, which would result in the creation of the undesired whirling motion.

The pad area 20 defining a bearing zone can be two or more pad areas equally spaced about the center line of the side forces. One such embodiment would comprise two relatively smooth sections protruding slightly from the bit body 12 on either side and equally spaced from the side force center line. The pad area 20 defining a bearing zone can comprise cutters of a different size, configuration, depth of cut, and/or rake angle than the cutters in the cutting zone. These different cutters would generate less cutting forces than the cutters in the cutting zone so the different cutters could still be considered relatively smooth as compared to the cutting zone. Another alternate embodiment would include one or more cylindrical rollers or caged ball bearings extending a rolling surface out from the bit body 12 to permit the bearing zone to more easily roll across the borehole wall.

The bearing zone can extend over as long or as small an area of the bit body as desired, with the constraints being having sufficient cutters and cutter arrangement in the cutting zone for efficient cutting of material. Further, the bearing zone can extend across the side portion of the bit body and downwardly onto a rounded face portion of the bit body if desired.

The bit body 12 can include a smaller diameter cutting zone, usually referred to as "pilot section", that extends coaxially out from a larger diameter cutting zone. One or more bearing zones or pad areas 20 can be located on the smaller, larger or both cutting zones. Preferably, the pad area 20 would be adjacent the smaller diameter cutting zone because the pad area 20 will be close to the center of the bit body 12 as possible which can reduce the torque that tends to cause the drill bit to roll onto the cutting zone and thus whirl.

Figure 3A:
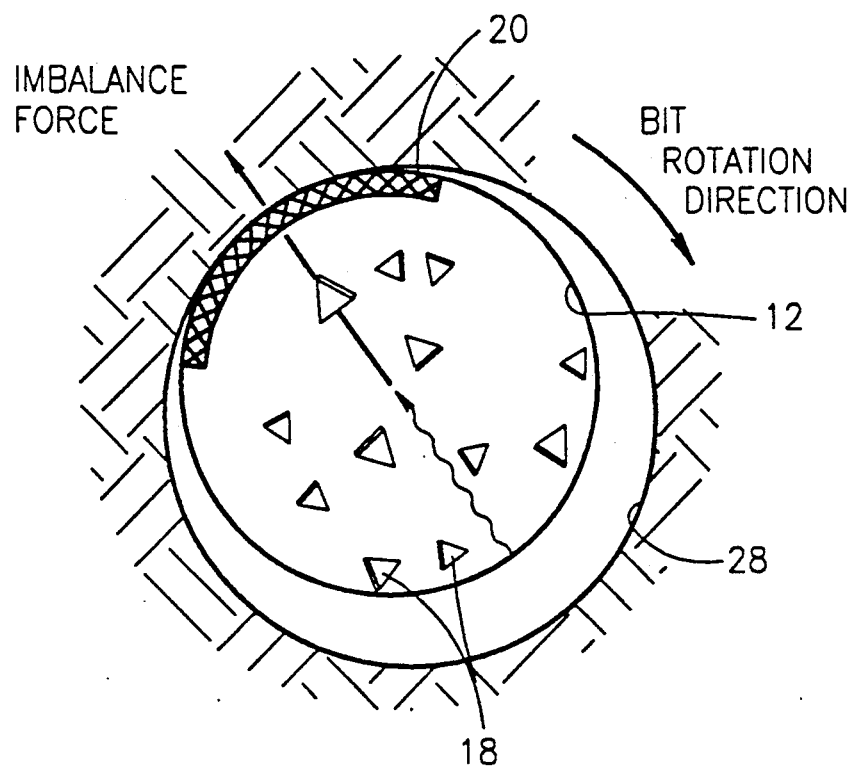
FIGS. 3A and 3B show a bottom view of a drill bit and the resulting forces at time t (FIG. 3A) and time $t + \Delta t$ (FIG. 3B).
Figure 3B:
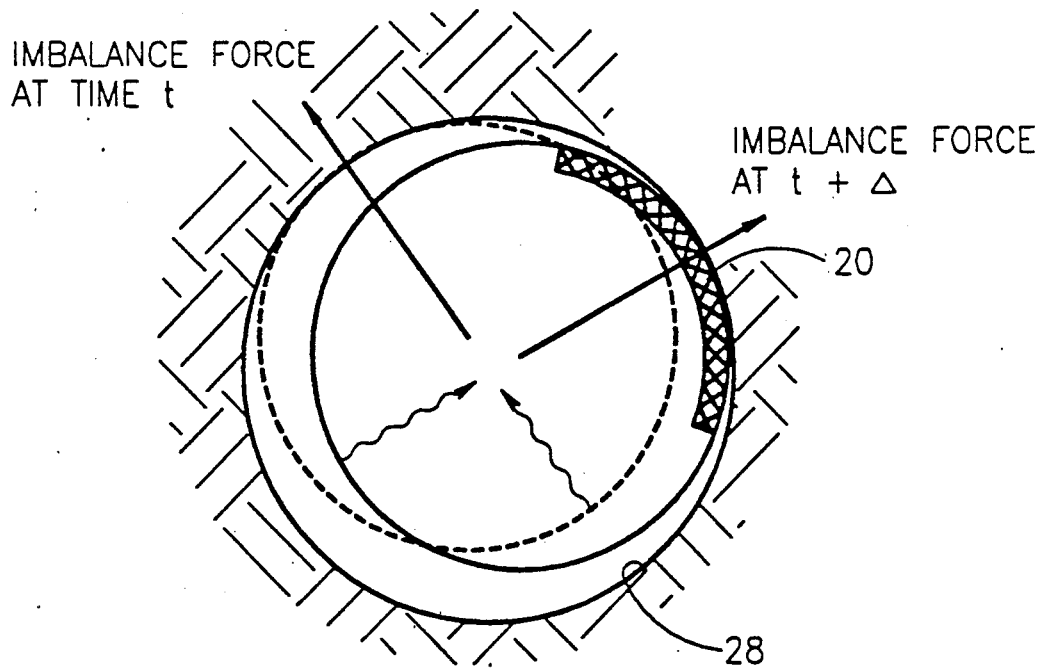

In operation, the pad area 20 prevents the whirling motion from starting in the following manner. As shown in FIG. 3A, a drill bit body 12 is shown rotating within a borehole 28. The plurality of cutters 18 spaced about the drill bit body 12 create an imbalance force that is directed towards one area of the bit where cutters have been removed from and/or replaced with a relatively smooth bearing zone. As shown in FIG. 3B, the bit body 12 has been rotated to a new position at a time $t + \Delta$. Because of the pad area 20, there is a greatly reduced number or no means for the bit body 12 to dig into the borehole wall 28 to create the whirling motion, because the pad area 20 slips or slides along the borehole wall without creating sufficient force to affect the center of rotation of the drill bit. Note the resulting force arrows originate at the same point, i.e., the center of rotation, not the geometric center of the drill bit. Thus, the center of rotation of the drill bit is between the center of the borehole and the bearing zone.

The use of the pad area 20 has the advantage of being relatively insensitive to bit wear, formation inhomogeneities and operating conditions. The imbalance force generated by the cutters change with wear, formation and operating conditions; however, the direction of the imbalance force does not significantly vary. Thus, this type of arrangement can be made to work to prevent bit whirl on most all configurations of drill bits.

The drill bit can be designed to have a greater mass on its side adjacent the pad 20 so that centrifugal forces push on the pad area 20, even if the drill bit rotates about its center axis. Another advantage is that if the drill bit does drill an overgauge hole (a hole larger in diameter than the outside diameter of the drill bit itself), the centrifugal force generated by the rotating imbalanced mass will act as a stabilizing force. Any perturbations, such as formation inhomogeneities, that may tend to counteract the imbalance force holding the pad area 20 on the borehole wall will be resisted by the centrifugal force generated during the normal drilling operation.

Method Of Making The Drill Bit

The method of this invention uses a geometric model of the cutting surfaces on a drill bit to calculate the forces acting on each of the cutting surfaces. In one aspect of the invention, a model is used to build a drill bit. In so doing, a major portion of the cutters are installed on the drill bit, a geometrical model of the bit is generated and the forces acting on each of the cutters for given drilling conditions are calculated. Thereafter, exact positions for the remaining cutters to be installed are calculated with the calculated position minimizing the radial component of the forces acting on the cutters. The remaining cutters are then installed in the calculated position.

Figure 4:
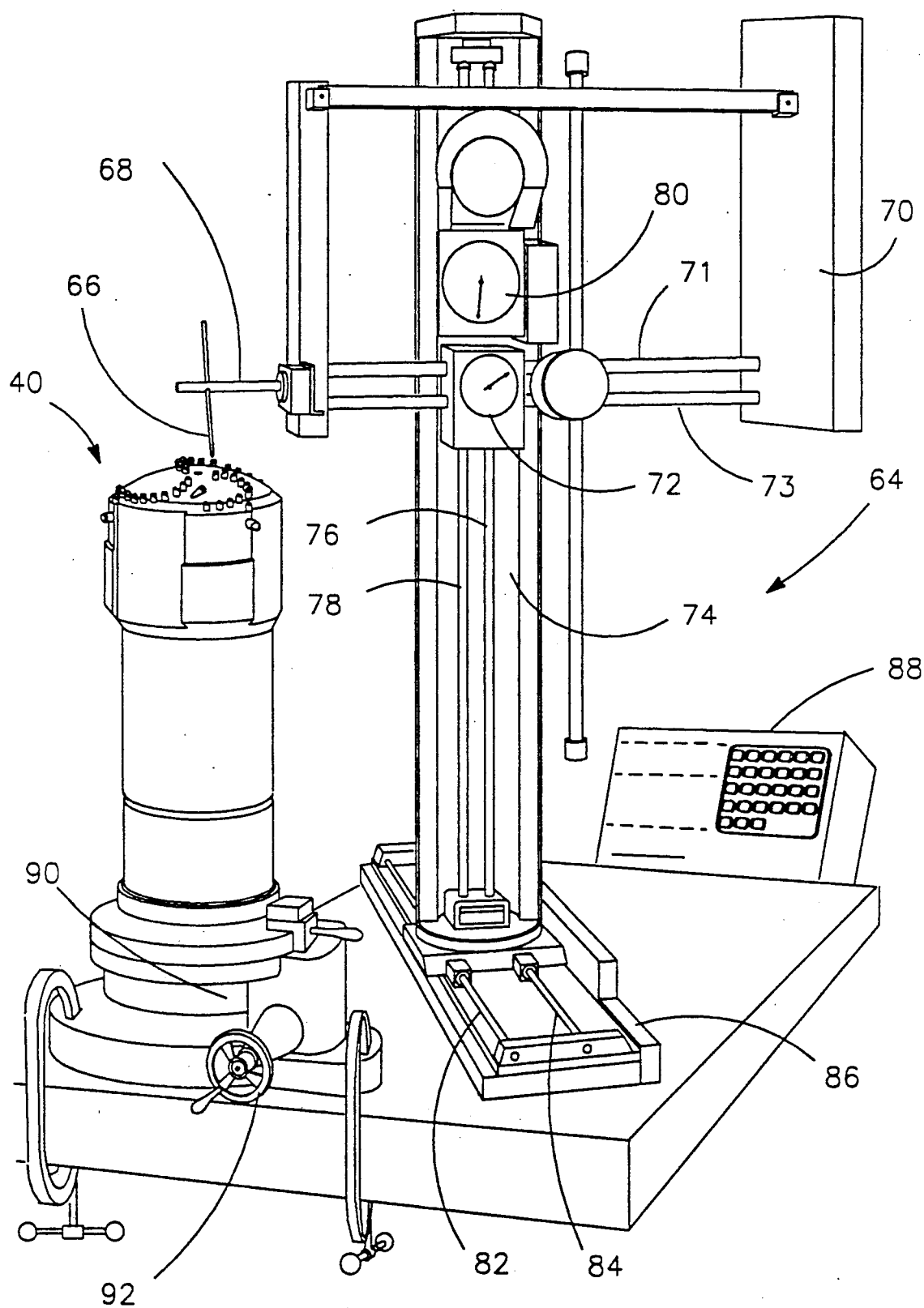
FIG. 4 is a perspective view of a coordinate measuring machine and a drill bit.

Turning now to FIG. 4, indicated generally at 64 is a commercially-available coordinate measuring machine shown adjacent bit 40. The coordinate measuring machine includes a pointer 66 fixedly mounted on a slidable arm 68. The lower end of pointer 66 is formed into a point which is fixed relative to arm 68.

Arm 68 is mounted on a laterally slidable frame 70. Frame 70 includes parallel rods 71, 73 along the axis of which frame 70 may slide. A meter 72 indicates the lateral position of frame 70 relative to an upright base 74.

Frame 70 is also vertically moveable along parallel rods 76, 78 with the height of the frame being indicated by a meter 80.

Parallel rods 82, 84 are mounted on a lower fixed base portion 86. Rods 82, 84 support upright base 74 for sliding movement along the axis of rods 82, 84. A meter (not visible) indicates the relative position of base 74 on rods 82, 84. Rods 82, 84 are oriented in space perpendicular to rods 76, 78 and to rods 71, 73. Likewise, rods 76, 78 and rods 71, 73 are each perpendicular to each of the other two sets of rods.

The readings on the meters indicate the relative positions of the rods used to define a point in space occupied by the pointed end of pointer 66. The position of the point on the pointer can thus be referenced to a three-dimensional coordinate system defined by X, Y and Z axes with each meter representing a relative position along one of the axes. A digital meter 88 provides a read-out of the X, Y and Z coordinates of the point on pointer 66 and also provides such coordinates, upon operator command, to the memory of a commercially available computer (not shown).

Drill bit 40 is mounted on a rotary turntable 90, the angular position of which is controlled by handle 92. An angular scale, not visible, shows the angular position of the turntable and thus of drill bit 40 which is supported thereon with its axis aligned with the turntable axis.

In the instant mode of implementing the method of the invention, pointer 66 is positioned on a plurality of points on the surface of the drill bit and the coordinates of each particular point are stored in the computer. From this data, a computer model of the drill bit is constructed. In making the measurements, a first set of measurements is made around the side of the bit so that the computer has data from which the longitudinal axis of the bit can be determined. A second set of measurements on the perimeter of each cutter face is made. In making the measurements, the angular position of rotary table 90 is noted and is associated with the three values which are produced by measuring machine 64 for all measurements taken at that particular angle of the rotary table. This enables all measurements to be taken substantially normal to each measurement point and increases the accuracy of the measurement process.

After the bit is rotated 360° and several points are measured about the circumference thereof and recorded, each cutter face on the cutters is measured.

Figure 5:
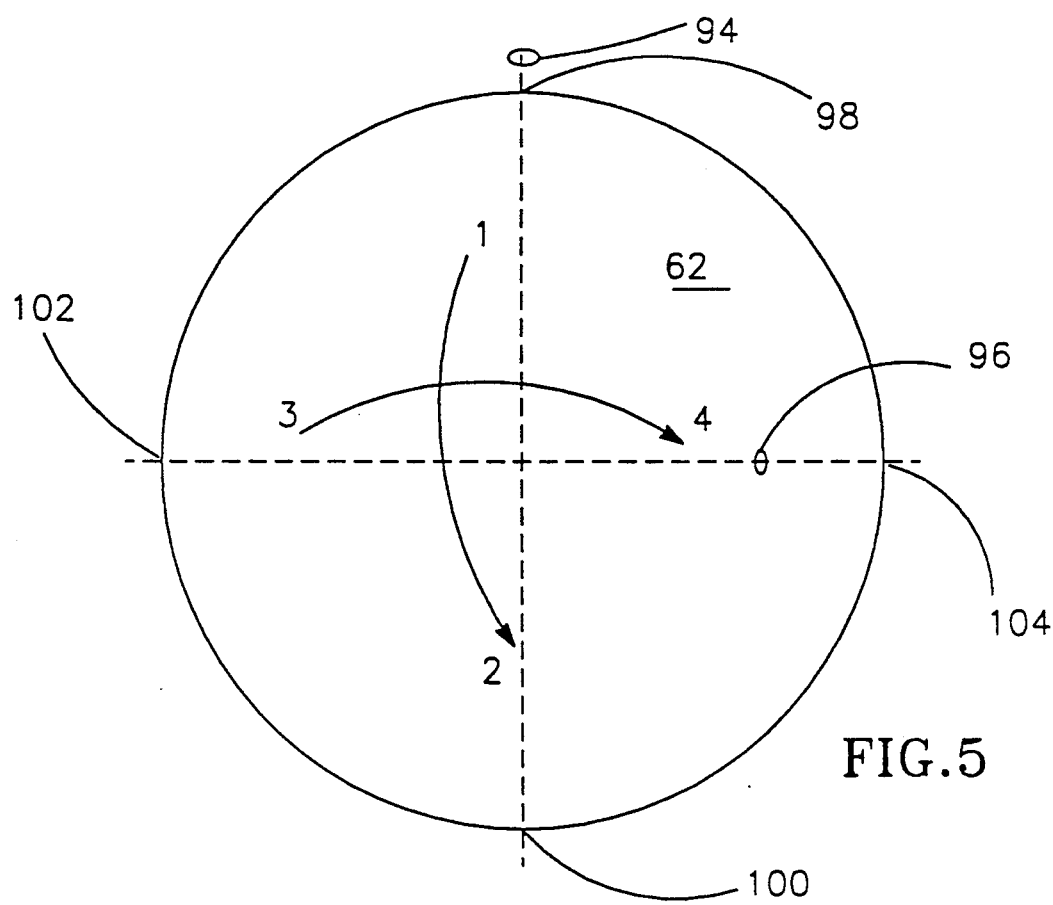
FIG. 5 is a view of an unworn PCD cutting surface.
Figure 6:
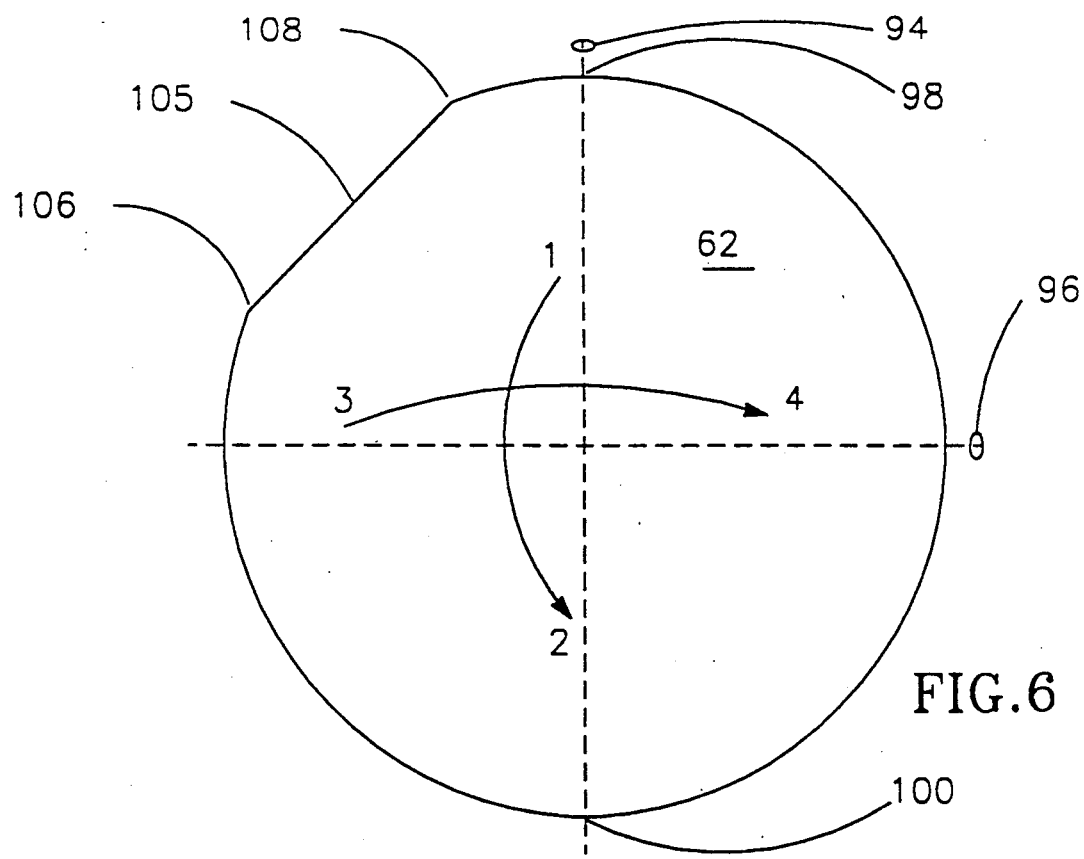
FIG. 6 is a view similar to FIG. 5 showing a worn PCD cutting surface.

For a description of the manner in which these measurements are made attention is directed to FIGS. 5 and 6. Each cutter face includes a vertical axis 94 which is substantially parallel to the cutter face and extends from the uppermost portion thereof to the lowermost portion. Also included is a horizontal axis 96 which extends from the leftmost to the rightmost portions of the cutter face and is parallel thereto. In making the measurements with the coordinate measuring machine, the point on pointer 66 in FIG. 4 is first positioned at the intersection of axis 94 with the perimeter of cutter face 62, such defining a first measurement point 98. A second measurement point 100 is located at the intersection of axis 94 with the lower edge of cutter face 62. A third measurement point 102 is at the left side intersection of axis 96 with the outer perimeter of cutting face 62 while a fourth measurement point 104 is at the right side intersection of axis 96 with the perimeter of cutting surface 62.

The numbers and arrows shown in the central portion of cutting face 62 in FIGS. 5 and 6 indicate the order in which the first four measurements on each cutting face on the drill bit are taken: along the cutting face vertical axis first and thereafter along the cutting face horizontal axis. When the point on pointer 66 is positioned first at point 98, the coordinates and angular position of the turntable are provided to the computer and likewise for each of the other four measuring points.

FIG. 6 is a view of cutting surface 62 after the bit has been used to drill a bore and thus includes a wear flat 105 on one side thereof developed as a result of the cutter being urged against the rock formation during drilling. When such irregularities occur on the perimeter of the cutting surface as in the case of FIG. 6, fifth and sixth measurement points 106 and 108 are taken in order to completely define the perimeter of the cutting face.

As each measurement is put into the computer, it is associated with a number which indicates the order in which the measurement was taken. In FIG. 5, the measurements at points 98, 100, 102 and 104 are numbered 1, 2, 3, 4, respectively, and in FIG. 6, the measurements are similarly numbered with measurements at points 106 and 108 being additionally numbered 5 and 6, respectively. Each cutting face is measured at a single angle on the turntable which is also recorded. In addition to the foregoing, a value is recorded to indicate the general shape of the edge of the cutting face between adjacent measurements. If the shape is generally a straight line, a zero is recorded and if the shape is generally a circular arc, a one is recorded. Thus, a number is provided to the computer memory to indicate the general shapes between each of the adjacent measuring points in FIG. 5.

In FIG. 6, a number value of one is recorded between the first and fourth measurements, between the fourth and second measurements, between the second and third measurements, between the third and fifth measurements, and between the sixth and first measurements while a zero is recorded between the fifth and sixth measurements to indicate the substantially straight line edge formed by worn portion 105. Thus, each of the recorded measurement points defines the perimeter of a cutting surface having a fixed angular orientation relative to the longitudinal axis of the drill bit. In addition, the connectivity between each adjacent point is stored in the computer memory. The connectivity is simply an indication of the shape of the cutting face perimeter between adjacent measurements. As will later become more fully apparent, the connectivity value between adjacent measurements is used to interpolate additional coordinates using circular interpolation, when the connectivity is one, and linear interpolation, when the connectivity is zero.

Figure 7:
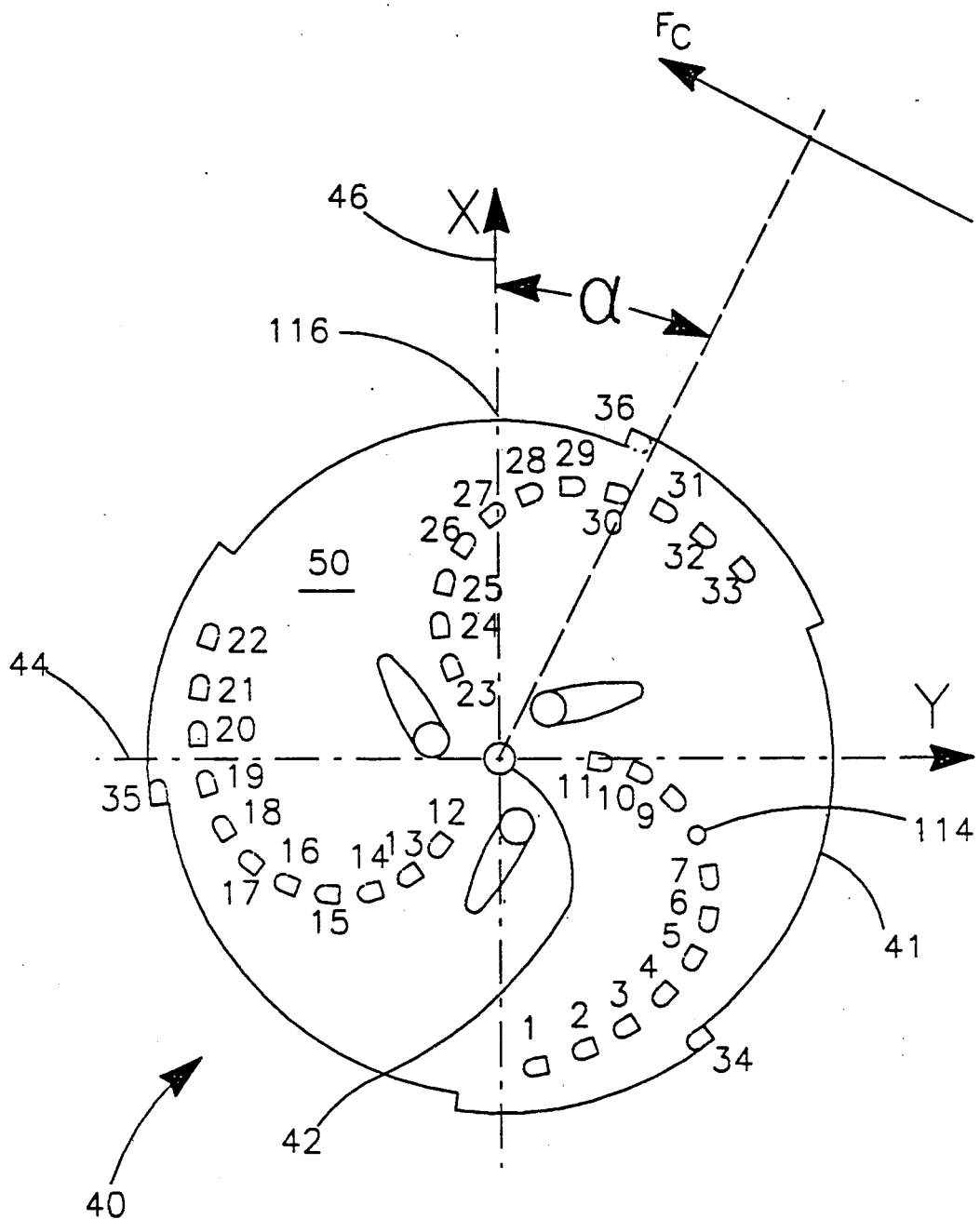
FIG. 7 is a plan view of the drill bit with a selected cutter not yet installed.

Turning now to FIG. 7, drill bit 40 is shown partway through the process of manufacture. As can be seen, cutters are all mounted on drill bit body 41, except for cutter 8. A bore 114 is formed in body 41 to receive the stud of cutter 8. Each of the other cutters has its stud press fitted into an associated bore in the drill bit body. Prior to mounting cutter 8 on the drill bit body, the dimensions of the drill bit body around the circumference thereof and the cutting faces of each of the cutters which are installed on the drill bit body are recorded and entered into a computer memory as previously described. Thus, the computer has data relating to the circumference of the drill bit body (from which the bit axis designated by axis 42, can be determined) and the position of each cutter face (except, of course for cutter 8 which is not yet installed) in space relative to the bit axis.

Figure 8:
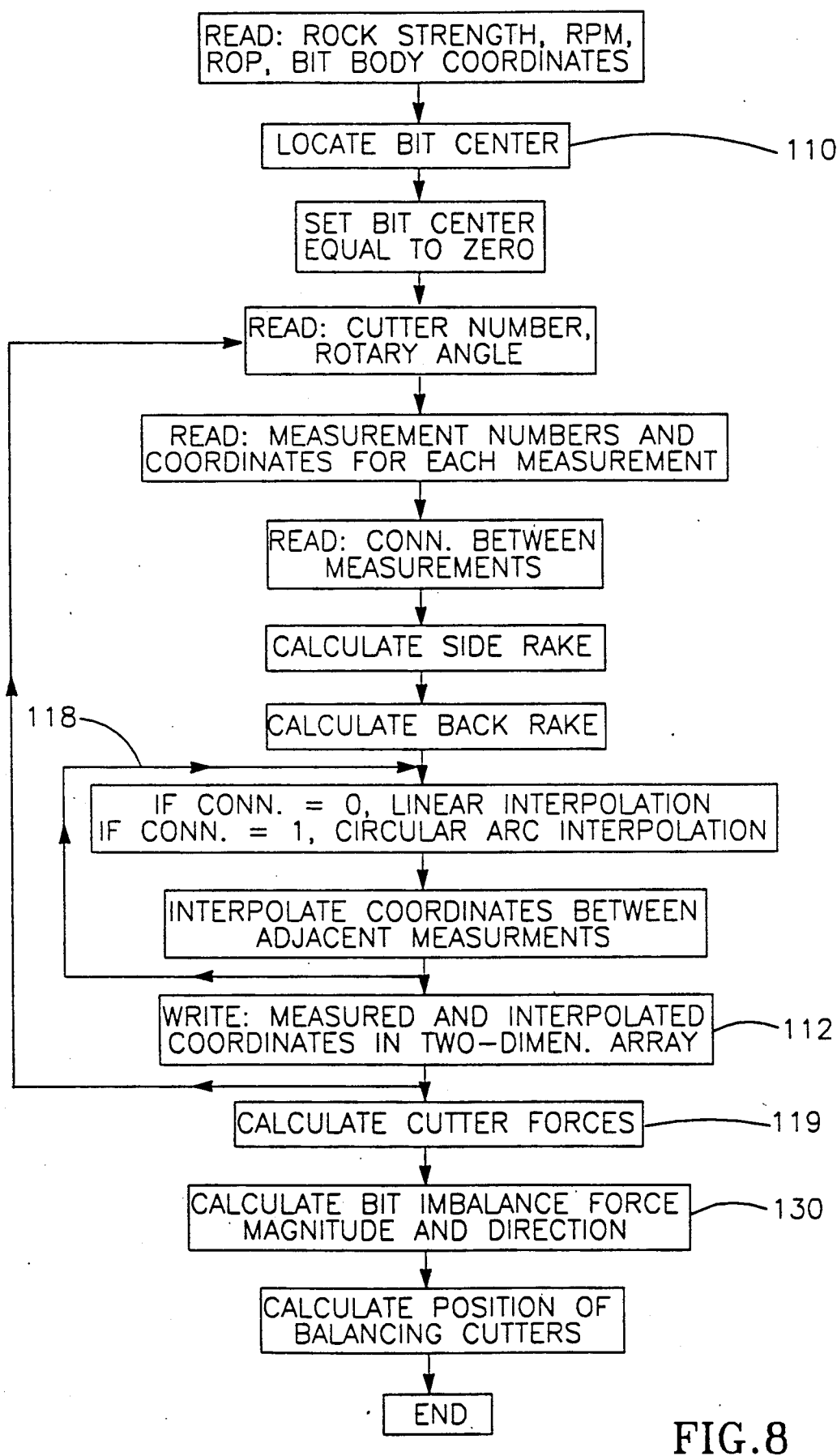
FIG. 8 is a flow chart illustrating the preferred mode of implementing the method of the instant invention.

Turning now to FIG. 8, included therein is a flow chart of a computer program for use in connection with manufacturing a drill bit. Although the entire flow chart deals with the manufacture of the drill bit, a significant portion of the computer program relates only to generating a model of a drill bit. As will later become more fully apparent, that portion of the program relating to modeling the bit begins at box 110 with the step of "Locate Bit Center" and concludes with box 112, "Write: Measured and Interpolated Coordinates in Two-Dimensional Array."

To initiate the program, data is provided relating to the strength of the rock in which the bit is to be used, the rate of revolution of the bit and the rate of penetration, i.e., the rate at which the hole is bored. Also, the bit body coordinates (those taken about the circumference of the drill bit body) are read from the computer memory.

Thereafter, the bit body coordinates are used to locate axis 42 by means of a least squares regression. A subroutine to accomplish this task can be written by a person having ordinary skill in the art.

As will be recalled, each of the three coordinates for each point measured on the bit body are referenced to the coordinate measuring machine rather than to the longitudinal axis of the drill bit body. After the longitudinal axis of the drill bit body is located in the coordinate system in which the measurements were taken, the coordinate system can be translated to set the vertical or Z axis to align with the bit center. Next, the data file for a particular cutter number and the rotary angle at which that data was generated is read from the computer memory. Thereafter, each measurement number, for example, one of a series of sequential numbers identifying the order in which the measurements were taken, is read with the coordinates associated with that particular measurement number. Then, the connectivity between adjacent measurements is read which, as will be recalled, defines the general shape, either straight line or generally circular arc, between adjacent measurements.

Next, the side rake of each cutter face is calculated. The side rake is defined relative to a vertical reference plane which contains axes 44, 46. The plane passes through the center of the drill bit body and divides it into equal halves. Coordinates which define the horizontal cutting face axis for a particular cutter, such being measurement points 102, 104 in FIG. 5, are rotated about the circumference of the drill bit center along the path the coordinates would travel during actual drill bit rotation. When the center point of the cutter face intersects the vertical reference plane, the angle between axis 96, the horizontal axis, and the vertical reference plane defines the side rake. It can be seen that the coordinates located at the center point of each cutter surface can be easily calculated since the same is defined by the intersection of axes 94, 96, the position of which are known.

In a similar fashion, back rake is defined as the angle between reference plane 116 and vertical axis 94 after the coordinates defining the horizontal and vertical axes are rotated until the intersection thereof intersects the reference plane. In other words, to calculate both side rake and back rake, the coordinates defining the cutter face are first rotated until the intersection of axes 94, 96 is received in the vertical reference plane. Thereafter, the angles between horizontal axis 96 and the reference plane (side rake) and vertical axis 94 and the reference plane (back rake) are measured. It is to be appreciated that a subroutine capable of rotating the coordinates and measuring angles as above described could be easily written by a person having ordinary skill in the art.

Figure 9:
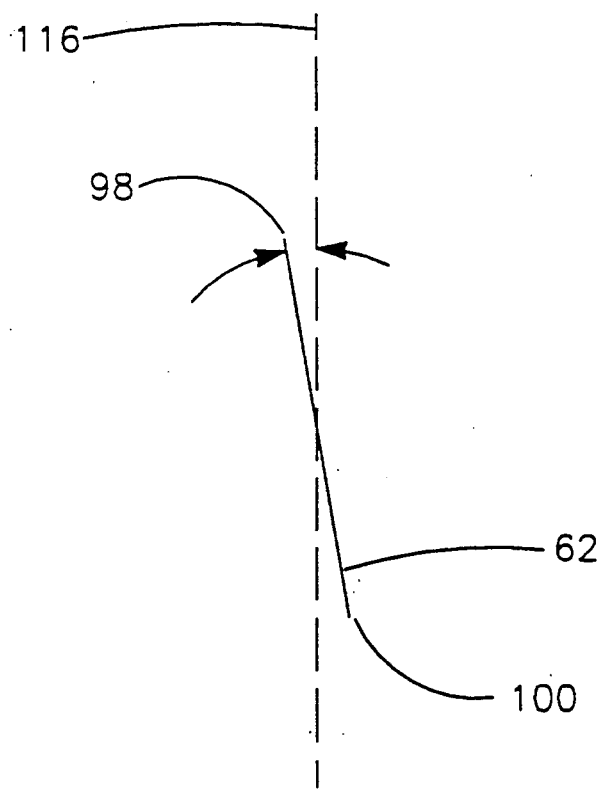
FIG. 9 is a schematic diagram of a PCD cutting surface showing the side rake angle.

By way of example, FIG. 9 is a top view of the drill bit body showing a vertical reference plane 116 which contains axes 42, 46. A cutter surface 62, representative of one of the cutter surfaces on drill bit 40, has been rotated until the center thereof intersects plane 116 as shown. It can be seen that since surface 62 is parallel to the longitudinal axis 42 of the drill bit body, there is zero degrees back rake. Thus, the angle shown in FIG. 9 is the side rake.

Figure 10:
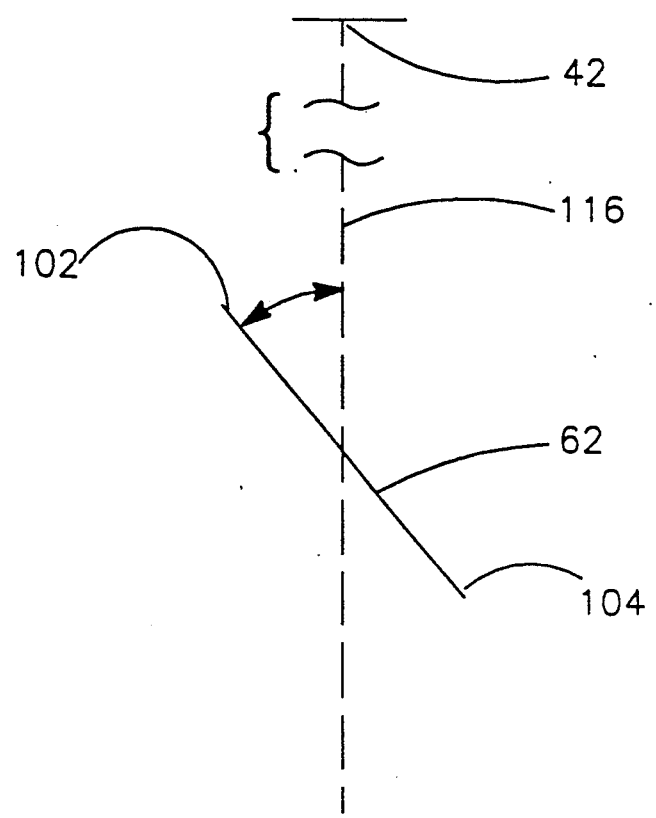
FIG. 10 is a schematic diagram of a PCD cutting surface showing the back rake angle.

FIG. 10 is a view of a cutter surface from the side of the drill bit. Cutter surface 62 has been rotated until the center of the same intersects plane 116. Surface 62 in FIG. 10 has zero degrees side rake since the surface is parallel with axis 42 and the angle shown in back rake.

It is to be appreciated that in most cases, cutter surfaces include both slight amounts of back rake and side rake. The views of FIGS. 9 and 10 are for the purposes of illustrating the manner in which back rake and side rake are measured.

Turning again to the flow chart of FIG. 8, after calculation of side and back rakes for a particular cutter surface, the program selects a measurement point on the circumference of the cutter surface and checks the connectivity between that point and the next clockwise measurement point. If the connectivity is zero, a linear interpolation is run between the adjacent coordinates to establish a series of coordinates along a straight line between the adjacent measured points. The program continues to the next clockwise measuring point, checks the connectivity between the adjacent points and if equal to 1, generates a series of coordinates by circular arc interpolation between the adjacent points. The program continues in a clockwise fashion about the cutter surface until a plurality of coordinates are produced by interpolation between adjacent measuring points which define the perimeter of the cutter surface. A loop 118 continues until coordinates have been interpolated between all measuring points thus defining the cutter face perimeter. Next, the program projects both the measured and interpolated coordinates into reference plane 116. Thus, each coordinate in the projected cutter face profile can be designated by two numerals and the measured and interpolated coordinates which define the perimeter of the cutter face are stored in a two-dimensional array. By way of example, attention is directed to FIG. 11 which is a plot of each of the cutter faces on drill bit 40 in FIG. 7 projected into reference plane 116. With the vertical axis corresponding to the drill bit body axis 42, each coordinate in the perimeter of a cutter face profile can be designated by a distance along a radial axis and a distance above the radial axis. For example, on the horizontal axis, zero is at the center of the bit body and 4.25 inches is at the circumference of the bit body since drill bit 40 in this example is an 8.5 inch bit.

Figure 11:
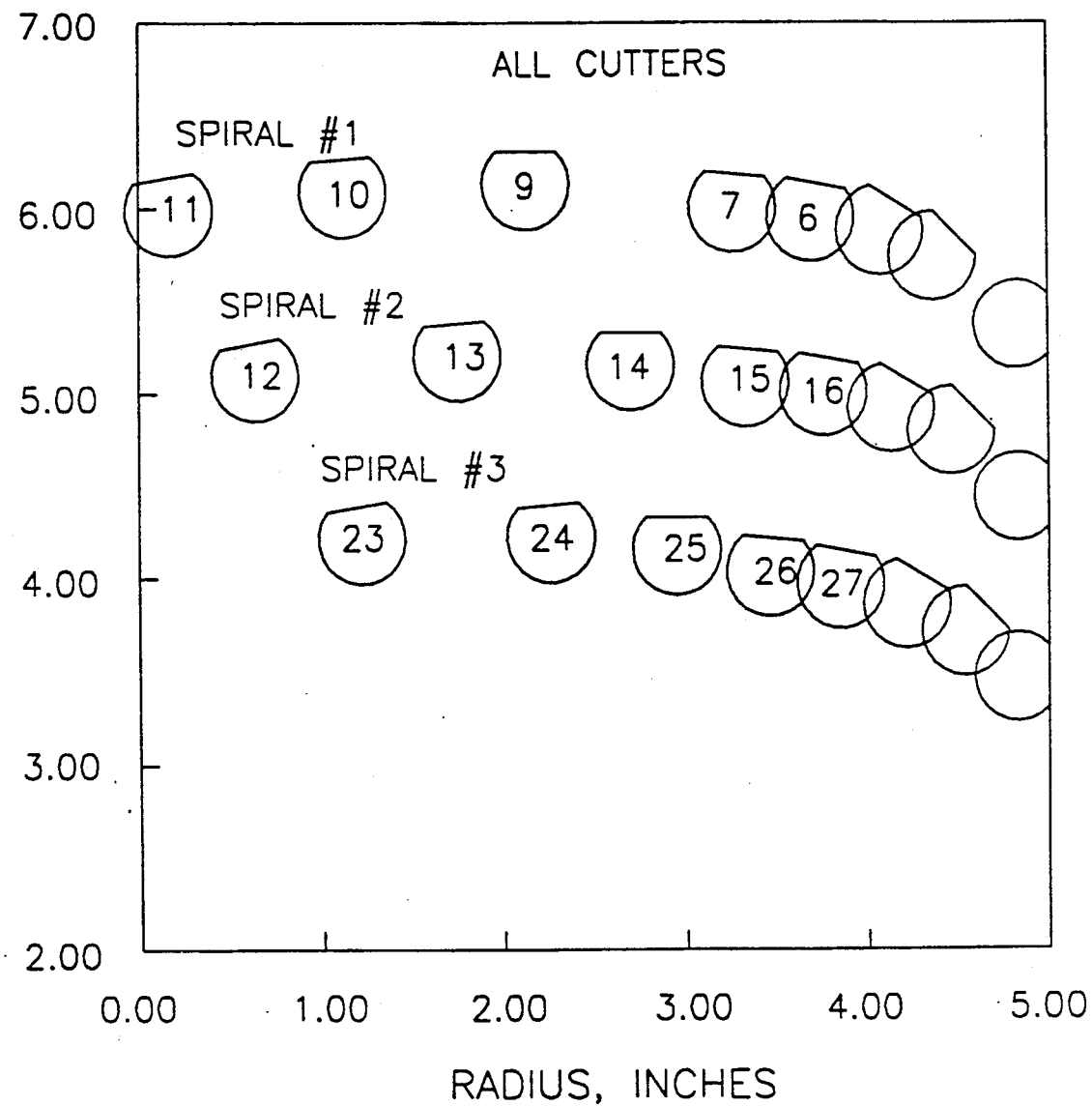
FIG. 11 is a plot of the drill bit cutter surfaces of a drill bit.

The profile in FIG. 11 includes an upper profile, designated "all cutters" which is how each of the cutter surfaces appears projected onto the reference plane. In order to more clearly identify the cutter surfaces in each of the three spirals, a projection onto the reference plane for each spiral is shown beneath the projection for all cutters. It can be seen in spiral number 1 that there is no profile for cutter 8 since the same has not yet been installed.

Figure 13:
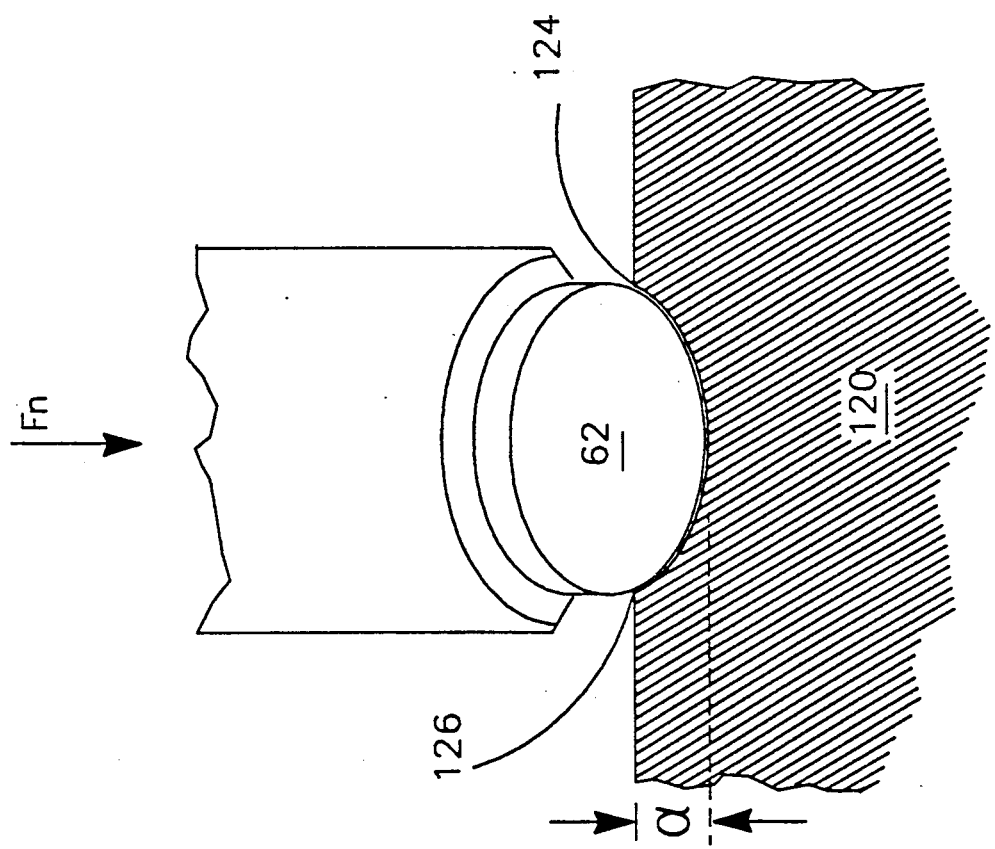
FIG. 13 is a view of a PCD cutting surface taken along lines 13—13 in FIG. 12.

Returning attention again to the Flow Chart of FIG. 8, after each of the cutter faces in cutters 1–7 and 9–36 have been represented in a two-dimensional array as described above, the program proceeds to box 119 and the step of calculating the forces acting on each cutter is undertaken. Considering now FIGS. 12 and 13, generally speaking the forces acting on an individual one of the cutters on the drill bit can be defined as a normal or penetrating force, such being designated $F_n$ in FIGS. 12 and 13, and a cutting force such being $F_c$ in FIG. 12. The normal force is the force required to cause the cutter to penetrate into the rock and is given by the formula:

$$F_n = \frac{\text{Cos}(\alpha - EBR)}{1 - \text{Sin}(\alpha - EBR)} \cdot d_w \cdot B_f \cdot RS \cdot d_{ce} \cdot C_1 + A_w \cdot RS \cdot C_2$$

In the above formula, alpha is the angle of the cutter from the X axis, in FIG. 7, which serves as an arbitrary reference axis which is parallel to axis 46 and, like axis 46, is contained in plane 116. EBR is the effective back rake which is a function of the real back rake and real side rake, both of which were discussed previously, and the angle at which $F_n$ acts.

Figure 14:
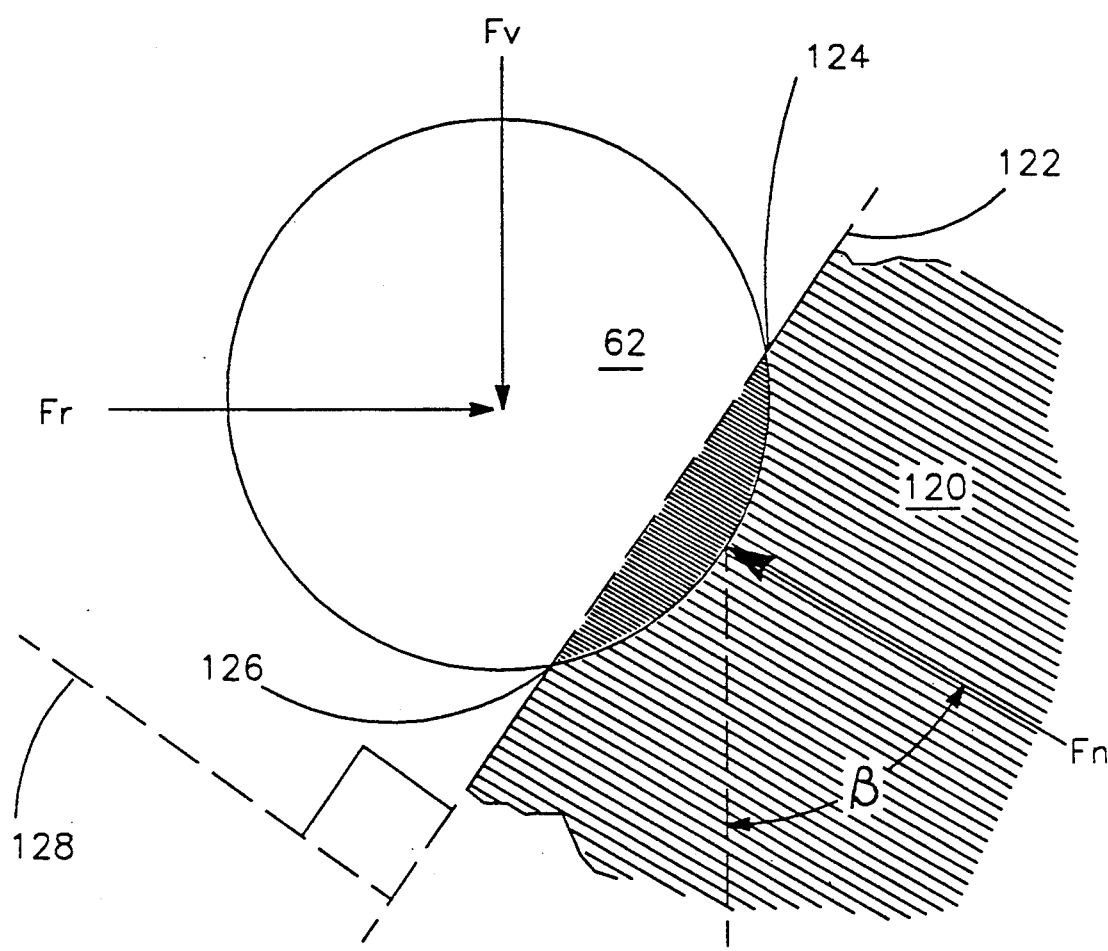
FIG. 14 is a diagram of a drill bit cutting surface embedded in a rock formation.

Referring to FIG. 14, cutting surface 62 is schematically illustrated embedded in a rock formation 120. Although not shown in FIG. 14, most of the other cutting surfaces on the drill bit body are embedded to one extent or another in formation 120. The effective back rake (EBR) may be thought of as the angle between cutting face 62 of the cutter and a cutting plane 122. Cutting plane 122 is parallel to an axis formed between points 124 and 126 on the cutting face and is perpendicular to $F_n$. Points 124 and 126 are the points at which the surface of formation 120 intersects cutting face 62. In other words, the shaded area on face 62 defines the cross-section of the cut in formation 120 being made by cutting face 62.

Plane 122 is further oriented in that a perpendicular axis 128 to plane 122 passes through the longitudinal axis of the bore being drilled. Of course, when there is no wobble of the drill bit during drilling, the longitudinal axis of the bore and the drill bit are coincident.

In summary, the effective back rake is the angle between cutting face 62 and cutting plane 122 as shown in FIG. 14. The effective back rake can be computed when the real side and back rakes are known, which will be recalled, were calculated by the program and when the position of cutting plane 122 is known. The position of cutting plane 122 is dependent upon the depth of the cut which, in turn, is dependent upon the rate of penetration and bit revolution. As will be recalled, these values are input to the program as preselected parameters indicative of the drilling conditions under which the bit will be used.

$B_f$ is the bit factor, a variable which ranges between about 0.75 and about 1.22 and which in the instant mode of implementing the invention is selected to account for slight differences between simulations on the computer model of bit wear for a given drill bit and real drill bit wear occurring under actual conditions. The bit factor, $B_f$, accounts for unexplained effects for a particular bit. A value of this factor greater than 1.0 indicates that the bit drills slower than expected and a value less than 1.0 indicates that the bit drills faster than expected. A person having ordinary skill in the art can empirically determine the value of $B_f$ for a selected drill bit.

The width of cut made by the cutter is designated $d_w$. In the instant mode of implementing the invention, the computer model generates a grid of parallel vertical lines across each cutter face and $d_w$ is equal to the width between adjacent lines. The equation is then calculated for each grid to generate a total force for the cutter.

The effective depth of cut is designated $d_{ce}$ and $C_1$ is a dimensionless constant, which in the instant manner of implementing the invention is equal to 1,100. The manner in which $C_1$ is determined will be shortly described, and $d_{ce}$ can vary slightly from the actual depth of cut. The manner of selecting the value of $d_{ce}$ is known to persons having ordinary skill in the art.

Considering now the second term of the equation for F, $A_w$ is the wear flat area, RS is again a constant related to the strength of the rock formation and $C_2$ is a constant equal to 2,150.

The first component in the equation for $F_n$ is equal to the amount of downward force required to prevent the cutter face from riding up out of the cut for a selected cutting depth and width. The second component of the equation for $F_n$ includes a factor for a dull cutter which has a wear flat of area $A_w$ formed thereon. This portion of the normal force is that required to compress the rock beneath a dull cutter to enable it to penetrate the rock. $C_1$ and $C_2$ can be empirically determined by first using a new bit thus setting $A_w$ to zero and therefore causing the entire second term to go to zero. A known normal force can be applied and with each of the other factors known, $C_1$ can be determined. Thereafter, the value of $C_1$, 1,100 in the instant mode of implementing the invention, is inserted into the equation and the bit is used until wear flats appear. Thereafter, wear flat area is measured and inserted into the equation which is then solved for $C_2$, which in the instant mode of implementing the invention equals 2150.

Figure 12:
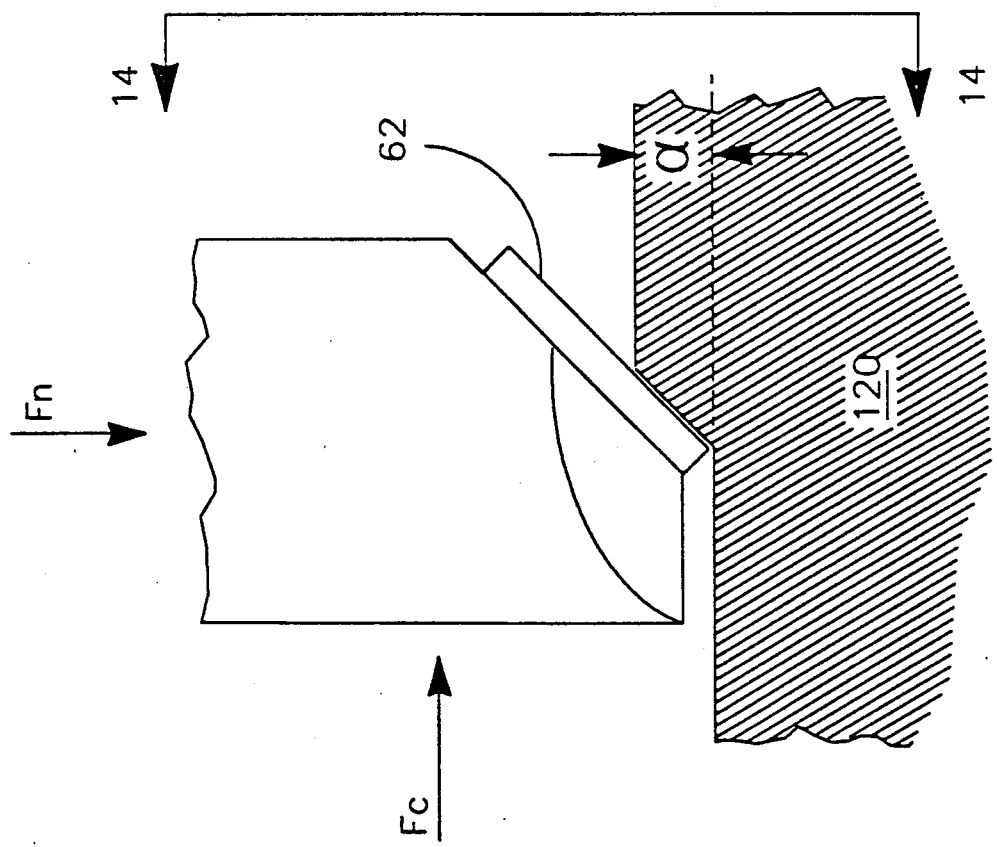
FIG. 12 is a side view of a cutter embedded in a rock formation.

The circumferential cutter force, $F_c$ in FIG. 12, is that required to advance the cutter along the cut after the normal force embeds the same in the formation. An arrow depicting the orientation of $F_c$ is also shown in FIG. 7. The circumferential cutter force is dependent upon the sliding friction between the cutter and rock and the force required to fracture the rock. The following equation can be used to calculate the circumferential cutter force:

$$F_c = \frac{\sin(\alpha - BR)}{1 - \sin(\alpha - BR)} \cdot C_3 \cdot RS \cdot d_w + C_4 \cdot F_N$$

The first term of the circumferential cutter force equation is the cutting force, i.e., that required to fracture the rock, and the second term is the nonproductive friction carried on a cutter wear flat. The variables in the equation are as described above and, in addition, $d_w$ is the mean depth of cut. In the instant mode of implementing the invention, the dimensionless constant $C_3$ and $C_4$ are equal to 3,000 and 0.3, respectively.

$C_3$ and $C_4$ can be determined empirically by drilling with two known circumferential forces applied to the drill bit, inserting all the known variables into the circumferential cutting force equation at each value of circumferential force and solving both equations for $C_3$ and $C_4$.

In the example under consideration, i.e., drill bit 40 in FIG. 7, the value of the circumferential and normal forces, as illustrated in FIG. 12, at each cutter is calculated. As noted above, the depth of cut is a function of the rate of penetration and the bit rotation rate which are both provided to the computer as preselected values. Since the cutters on the drill bit can cut on a surface that is inclined to the vertical by an angle beta, illustrated in FIG. 14, the normal force can be resolved into a vertical and radial component and the circumferential force can be resolved into radial components, and a moment about the bit center. The radial component of the normal force, identified as $F_r$ FIG. 14, is equal to $F_n \cdot \sin(\beta)$.

The components of the normal force and the circumferential force which act on the bit in the plane normal to the bit rotational axis can be resolved into a single force acting on the bit center and a single couple, both lying in the normal plane. The couple is the torque required to rotate the bit and the force is the imbalance force, i.e., that force which tends to push the bit against the side of the bore.

It is helpful in computing the magnitude and direction of the imbalance force to resolve the cutter forces into components along the X and Y directions as referenced in FIG. 7. As mentioned, these axes are arbitrarily chosen but are fixed relative to any particular identifying feature on the bit. The vertical penetrating force, $F_v$ has no component in these directions. The radial penetrating force $(F_r)$ of the normal force $(F_n)$ can be resolved into components along the X and Y axes by the following equations:

$$F_{x-r} = F_r * \cos(alpha)$$

$$F_{y-r} = F_r * \sin(alpha)$$

Since the circumferential force acts at right angles to the radial force for each cutter, it can be resolved into components in the X and Y directions with the following equations:

$$F_{x-c} = F_c * \cos(alpha - 90)$$

$$F_{y-c} = F_c * \text{sig}(alpha - 90)$$

It is to be appreciated that at each cutter, there is no radial component of $F_c$; however, when the value of $F_c$ at each cutter is resolved into components along the X and Y axes in FIG. 7 with those vectors being summed, there can be a total radial component of the circumferential force. The total X and Y components of the imbalance force is then obtained by summing the components from the individual cutters as follows:

$$F_{xt} = F_{x-r} + F_{x-c}$$

$$F_{yt} = F_{x-r} + F_{y-c}$$

After such summing, the magnitude of the radial imbalance force is given by:

$$F_i \sqrt{F_{xt}^2 + F_{yt}^2}$$

Returning again to the flow chart of FIG. 8, it can be seen that the step identified in box 130 is performed by resolving the cutter forces in a plane perpendicular to the drill bit axis into a single imbalance force as described above. In a similar manner, a moment that tends to tilt the drill bit in a plane parallel to the central axis is calculated.

The final step in the flow chart is identified as "Calculate Position of Cutters." In the example under consideration, there is only one cutter, cutter 8, remaining to be mounted on the drill bit body. An iterative process can be used to calculate the position for cutter 8 which directs the imbalance force towards the bearing zone. First, it can be seen that the cutter can be radially positioned about the longitudinal axis of the cutter stud within bore 114, and further can be installed at depths which vary from completely seated, i.e., with the stud being received abutted against the lower end of bore 114, to some position thereabove. Initially, an arbitrary back and side rake and vertical position of the cutting face, within preselected ranges, is assigned to cutter 8 and the program to model the drill bit and calculate cutting forces is rerun with cutter 8 in the assigned position. The program is repeatedly rerun with the face of cutter 8 being repositioned in a direction which tends to increase and properly direct the imbalance force. The program ultimately produces a set of coordinates which identify a position for the cutting face of cutter 8. Thereafter, cutter 8 is installed with care being taken to position the cutting face thereof in the calculated position.

The following Table I provides an output generated after placement of cutter 8. Calculated values include the volume of cut (volume removed in one revolution) and velocity of each cutter. The given rotary speed and penetration rate are shown below the table. Wear flat area is calculated in a known manner for 5.0 hours drilling. Percent imbalance is the imbalance force expressed as a percentage of weight-on-bit, which is the total of $F_{yt}$ for each cutter.

rectly affixed to a drill bit body by brazing or other known techniques.

It can be seen that program permits manufacture of the drill bit with the initial set of cutters being installed with relatively gross manufacturing tolerances as to the position of the cutter faces. Thereafter, when the position of the balancing cutter or cutters is determined, which properly directs the imbalance force, great care can be taken to so position the final cutters in order to obtain the desired result. Thus, the method of the invention enables installation of the great majority of cutters

TABLE I

| CUTTER NO | AREA CUT | VOL CUT | β | $F_{xt}$ | $F_{yt}$ | $F_n$ | VEL M/S | WEAR FLAT | EFF BR |
|---|---|---|---|---|---|---|---|---|---|
| 27 | 0.0057 | 0.1081 | 13.4 | 335. | 442. | 455. | 0.96 | 0.02150 | −25.8 |
| 28 | 0.0054 | 0.1155 | 21.3 | 332. | 431. | 463. | 1.07 | 0.02309 | −25.7 |
| 36 | 0.0000 | 0.0000 | 0.0 | 0. | 0. | 0. | 0.00 | 0.00000 | 0.0 |
| 29 | 0.0063 | 0.1479 | 26.8 | 353. | 458. | 513. | 1.18 | 0.02749 | −24.2 |
| 30 | 0.0091 | 0.2301 | 36.2 | 419. | 531. | 657. | 1.27 | 0.03725 | −20.5 |
| 31 | 0.0042 | 0.1125 | 30.0 | 231. | 328. | 379. | 1.36 | 0.02301 | −22.4 |
| 10 | 0.0165 | 0.0988 | −9.1 | 757. | 893. | 905. | 0.30 | 0.01811 | −23.2 |
| 32 | 0.0011 | 0.0310 | 52.6 | 77. | 80. | 132. | 1.36 | 0.01358 | −24.6 |
| 9 | 0.0137 | 0.1503 | 0.6 | 723. | 867. | 867. | 0.56 | 0.02581 | −25.1 |
| 33 | 0.0000 | 0.0000 | 0.0 | 0. | 0. | 0. | 0.00 | 0.00000 | 0.0 |
| 8 | 0.0110 | 0.1611 | −3.7 | 591. | 735. | 736. | 0.75 | 0.02738 | −25.3 |
| 7 | 0.0078 | 0.1362 | 1.9 | 445. | 578. | 579. | 0.89 | 0.02538 | −25.9 |
| 12 | 0.0086 | 0.0218 | −17.1 | 411. | 458. | 480. | 0.13 | 0.00800 | −23.2 |
| 6 | 0.0053 | 0.1059 | 15.9 | 344. | 452. | 470. | 1.02 | 0.02340 | −26.6 |
| 34 | 0.0000 | 0.0000 | 0.0 | 0. | 0. | 0. | 0.00 | 0.00000 | 0.0 |
| 5 | 0.0071 | 0.1587 | 18.4 | 419. | 547. | 576. | 1.13 | 0.02981 | −25.6 |
| 4 | 0.0051 | 0.1237 | 32.2 | 290. | 361. | 427. | 1.22 | 0.02385 | −23.5 |
| 13 | 0.0115 | 0.0895 | 0.5 | 631. | 714. | 714. | 0.39 | 0.01655 | −25.9 |
| 3 | 0.0046 | 0.1243 | 35.6 | 263. | 352. | 433. | 1.36 | 0.02714 | −23.7 |
| 2 | 0.0003 | 0.0076 | 7.6 | 18. | 40. | 40. | 1.34 | 0.00826 | −17.2 |
| 14 | 0.0077 | 0.0941 | 3.1 | 422. | 542. | 543. | 0.62 | 0.01951 | −24.8 |
| 1 | 0.0008 | 0.0204 | 18.8 | 49. | 99. | 104. | 1.35 | 0.01509 | −18.1 |
| 15 | 0.0070 | 0.1099 | 6.0 | 381. | 508. | 510. | 0.80 | 0.02110 | −24.5 |
| 16 | 0.0065 | 0.1207 | 8.7 | 376. | 512. | 517. | 0.93 | 0.02399 | −25.2 |
| 17 | 0.0067 | 0.1370 | 19.0 | 399. | 519. | 549. | 1.05 | 0.02634 | −25.6 |
| 18 | 0.0030 | 0.0674 | 24.6 | 194. | 276. | 303. | 1.15 | 0.01911 | −25.3 |
| 19 | 0.0024 | 0.0602 | 33.5 | 161. | 207. | 248. | 1.26 | 0.01448 | −26.0 |
| 23 | 0.0151 | 0.0605 | −10.5 | 678. | 800. | 814. | 0.21 | 0.01447 | −22.9 |
| 35 | 0.0000 | 0.0000 | 0.0 | 0. | 0. | 0. | 0.00 | 0.00000 | 0.0 |
| 20 | 0.0015 | 0.0395 | 13.7 | 78. | 140. | 144. | 1.34 | 0.01249 | −18.4 |
| 21 | 0.0009 | 0.0230 | 37.3 | 77. | 98. | 123. | 1.36 | 0.01148 | −29.7 |
| 22 | 0.0004 | 0.0099 | 32.2 | 29. | 47. | 56. | 1.36 | 0.00970 | −24.2 |
| 24 | 0.0124 | 0.1144 | 0.7 | 614. | 744. | 744. | 0.47 | 0.02027 | −24.2 |
| 25 | 0.0095 | 0.1264 | 2.8 | 514. | 642. | 643. | 0.67 | 0.02291 | −25.0 |
| 26 | 0.0066 | 0.1092 | 5.8 | 354. | 480. | 483. | 0.84 | 0.02072 | −23.9 |
| 11 | 0.0166 | 0.0159 | −12.6 | 496. | 692. | 709. | 0.05 | 0.01129 | −14.2 |

ROTARY SPEED = 120. RPM
PENETRATION RATE = 30. FT/HR
ROTATING TIME = 5. HR
IMBALANCE FORCE = 1056. LB
PERCENT IMBALANCED = 7.% of WOB
IMB. FORCE ANGLE = 71. DEG
RAD. IMB. FORCE = 249. LB
CIR. IMB. FORCE = 1156. LB
WEIGHT-ON-BIT = 14576. LB
BIT TORQUE = 2247. FT-LB
TOTAL WEAR FLAT AREA = 0.643 IN

It should be appreciated that the method is not restricted to simply positioning a cutter within a predrilled bore. The program can be used to select the position for the bores in the drill bit body of one or more cutters after a preselected number of cutters are installed and the program run to determine the imbalance force. An iterative process similar to that described above can be used to position two or more remaining cutters either within predrilled bores, as in the example under consideration, or the program can be used to determine the position of bores to be drilled.

Moreover, the program is not necessarily limited to cutters of the type having studs extending therefrom which are received in bores in a drill bit body. The same program can be used to position cutters which are diunder relatively gross tolerances thus saving time and money in the manufacturing process. In addition, the program generates a location for the final cutter or cutters which consistently properly directs the imbalance force in the drill bit so manufactured. Average quality of bits so manufactured is therefore greatly increased over the average quality of bits manufactured in accordance with prior art methods.

Further, the present invention can easily be used to modify an existing drill bit to include the defined bearing zone in a proper location. This modification can be accomplished by determining the direction of the imbalance force, as described above, and then elimination cutters on an area where the imbalance force is directed towards. The removed cutters can be replaced with a built-up pad, a plurality of studs or pads. A number of such iterative steps may need to be taken to ensure that the quantity of imbalance force is acceptable and directed in the proper location. Such iterative steps can include replacement, removal and rearranging of cutters to achieve the desired results.

Drilling Test Results

A commercially-available PDC drill bit was selected because it has a very imbalanced design and drills poorly. To ensure that this poor performance was not representative, three different drill bits of the same manufacturer, model and size were tested and all performed similarly. The primary cause of the poor performance is due to bit whirl, which causes the drill bit to drill a lobed bottom hole pattern. In order to test the present invention, one of the selected PDC drill bits was modified to incorporate a low friction bearing zone. This resulted in a drill bit that was adequate to test the low friction gage concept, but was not an optimized design.

Figure 15:
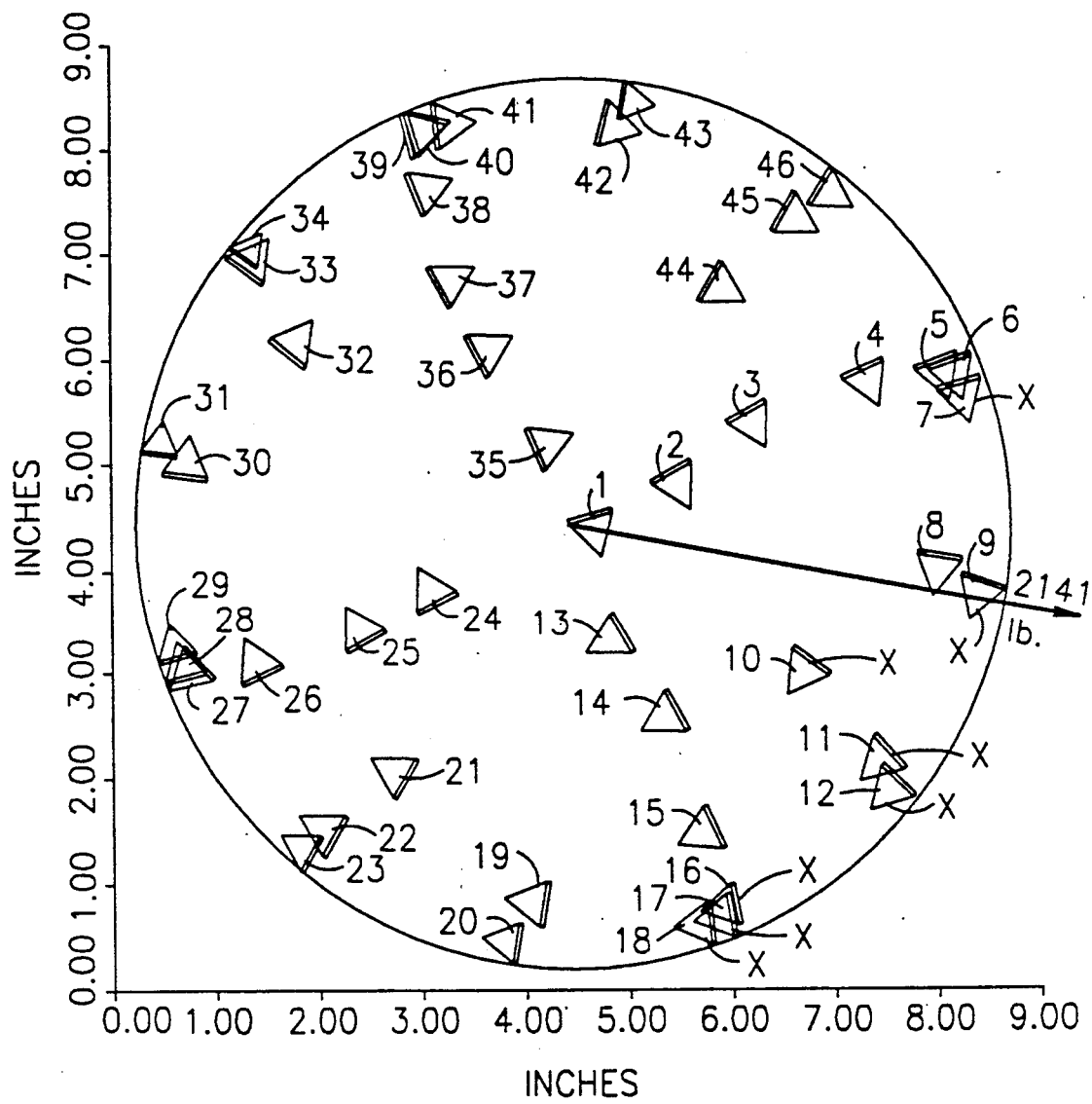
FIG. 15 is a bottom view of a drill bit showing cutters to be removed to define a bearing zone.

FIG. 15 shows the drill bit's cutter layout and the calculated direction of the about 2100 lb imbalance force is indicated. The magnitude and direction of this imbalance force was calculated with the PDC drill bit model computer program, described fully above. To define the bearing zone, cutters were removed as indicated on the side of the bit to provide a relatively smooth sliding surface, rather than a cutting surface. Even though the bearing zone is referred to as low friction, the particular geometry of this drill bit still provided fairly high friction.

Figure 16:
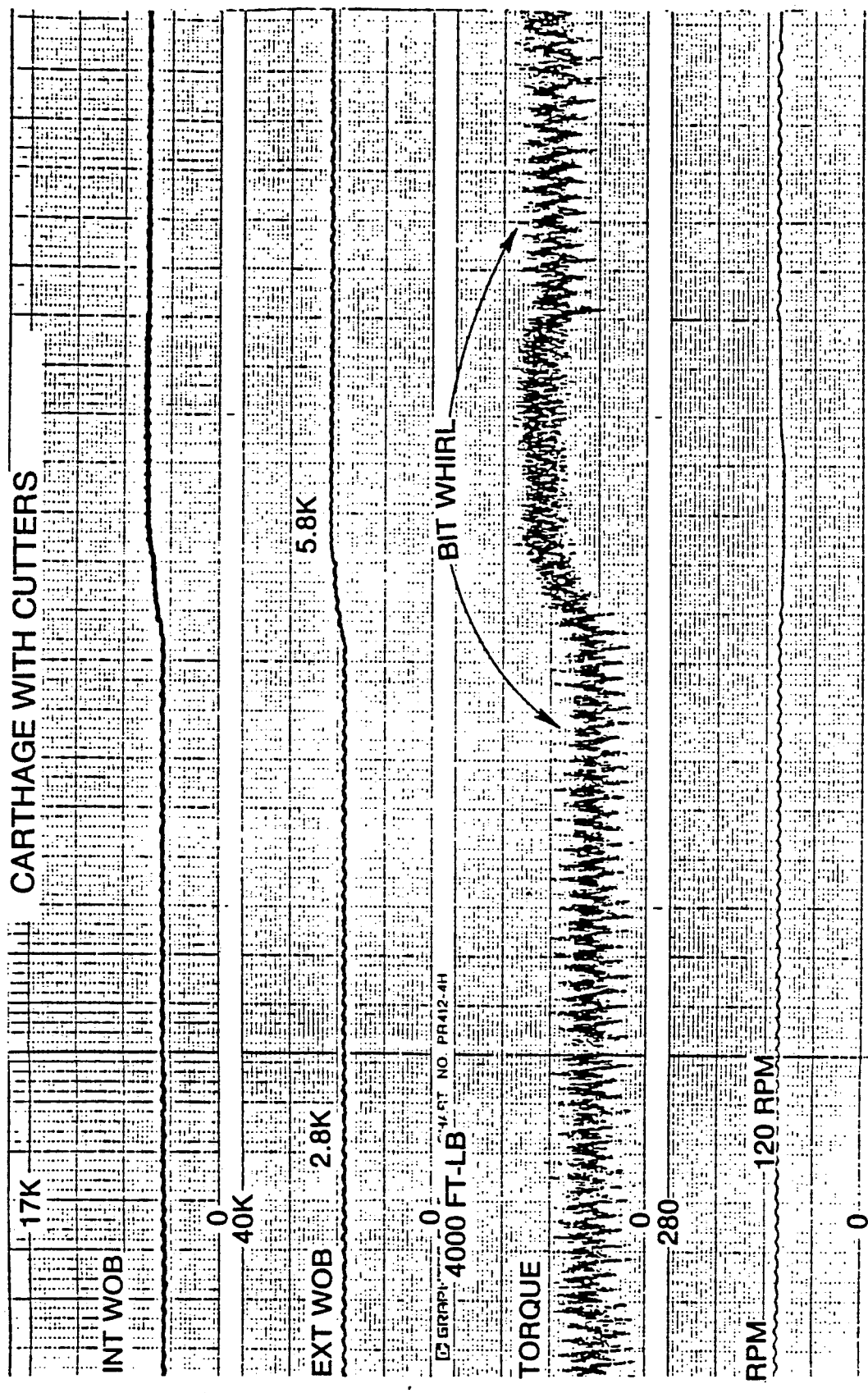
FIG. 16 is a graphical representation versus time of a torque and vibration output for a drill bit without a bearing zone drilling through Carthage material.
Figure 17:
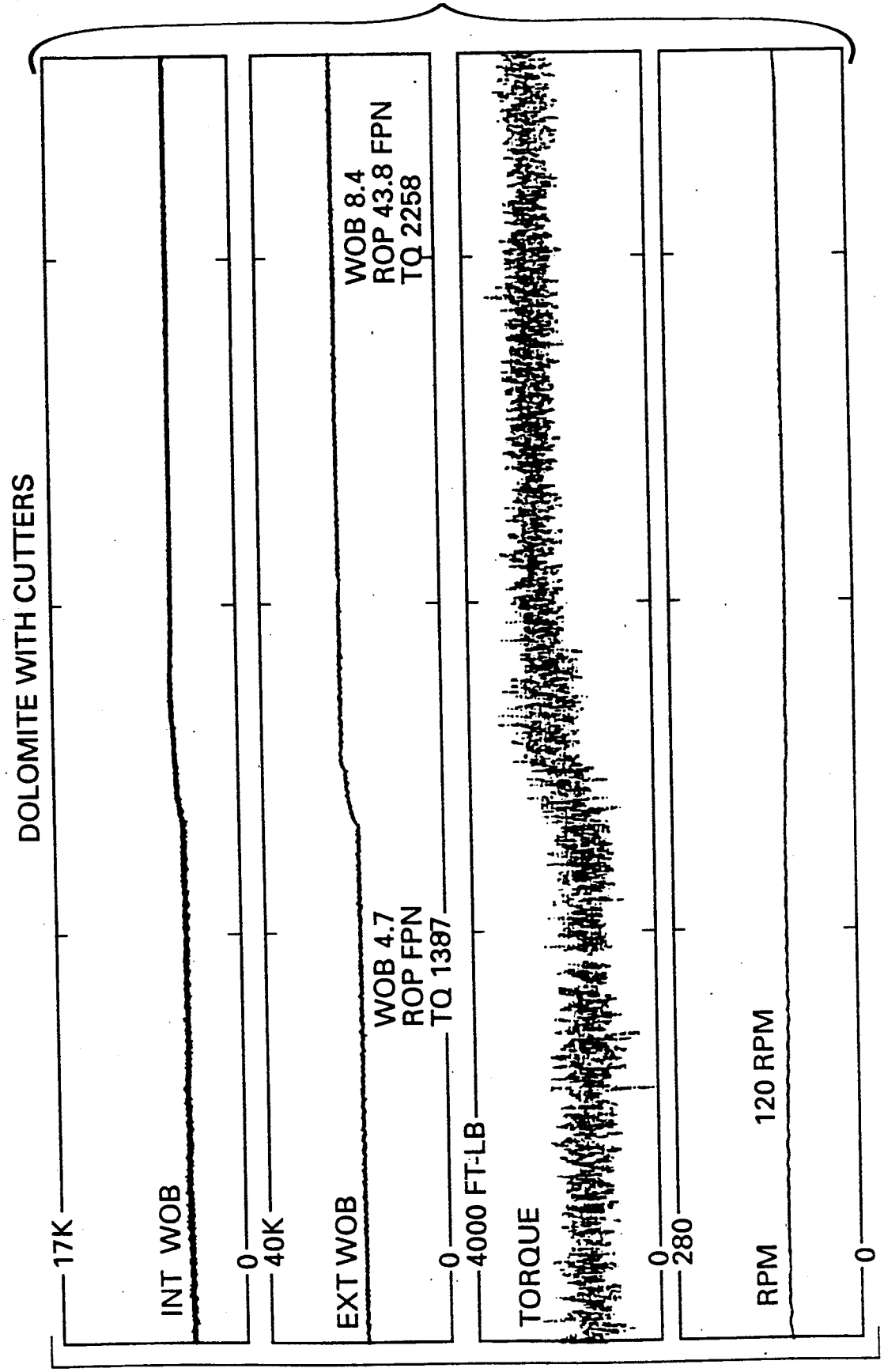
FIG. 17 is a graphical representation versus time of a torque and vibration output for the drill bit of FIG. 16 drilling through dolomite material.
Figure 18:
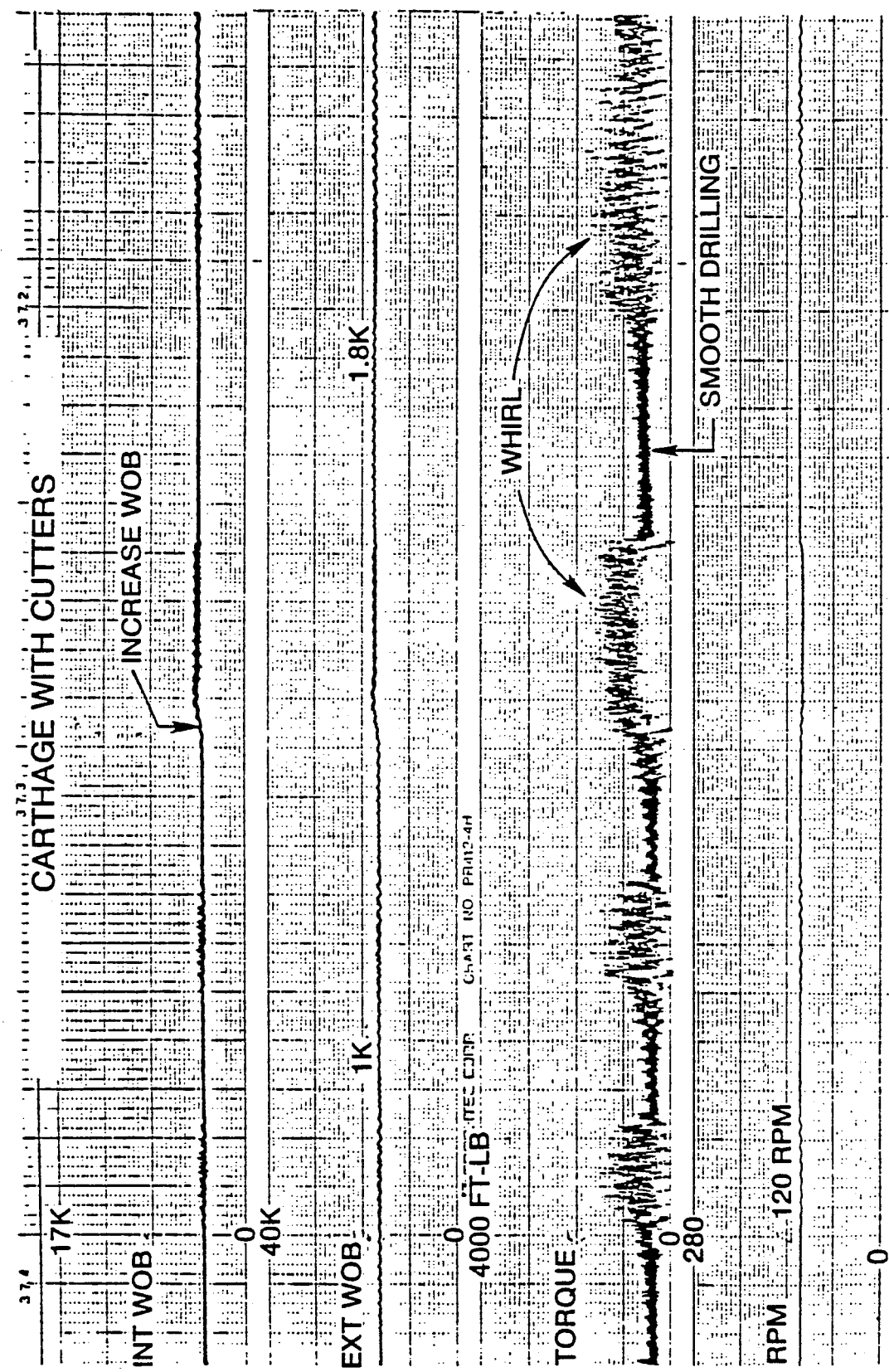
FIG. 18 is a graphical representation versus time of vibrations and torque for the drill bit of FIG. 16 drilling through Carthage material at increased WOB.

It is first beneficial to review the performance of the PDC drill bit before the cutters were removed in order to evaluate the benefit of removing the cutters. The bottom hole patterns showed whirling. FIGS. 16 and 17 show typical plots of the vibrations that occurred with the drill bit at 120 RPM and drilling through Carthage and Dolomite. FIG. 18 even shows that the PDC drill bit whirled at 1800 lb WOB and 120 RPM.

Figure 19:
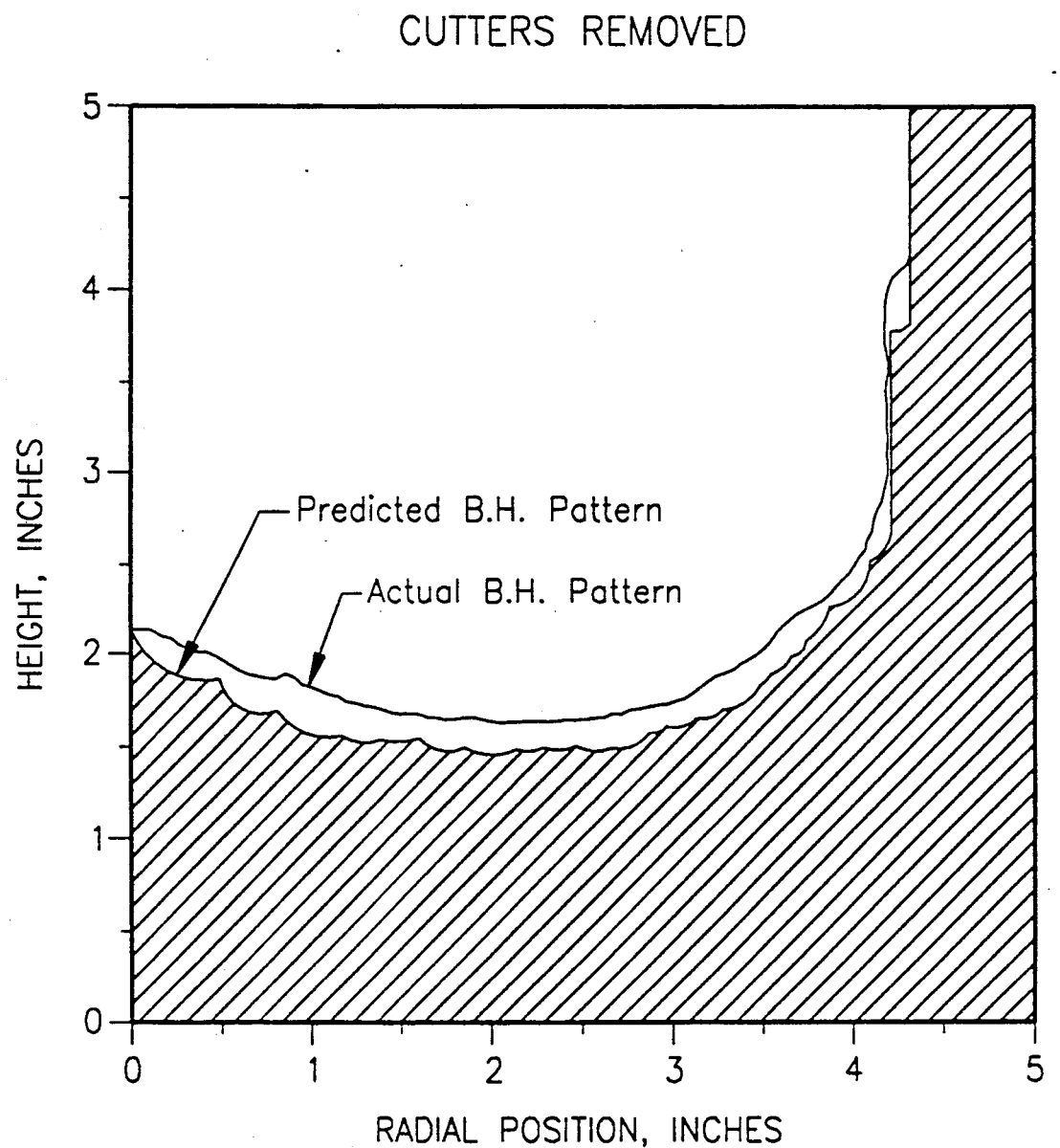
FIG. 19 shows a side view comparison of bottomhole pattern predicted and as actually measured for a drill bit of FIG. 16, but with certain cutters removed to define a bearing zone.

After removing the selected cutters to define a bearing zone located where the imbalance forces were directed towards, the drill bit was rerun in Carthage and Dolomite at conditions identical to the previous tests before removing cutters. Bottom hole patterns for the Carthage and Dolomite tests were extremely smooth. The Carthage hole was completely gage and the Dolomite was only 1/16 in. over gauge. FIG. 19 shows a comparison of the bottom hole pattern predicted by the computer program, described fully above, and that measured from the Carthage test. The excellent agreement between the prediction and the actual indicated that the drill bit was loaded as predicted by the model and should provide a very long wear life.

Figure 20:
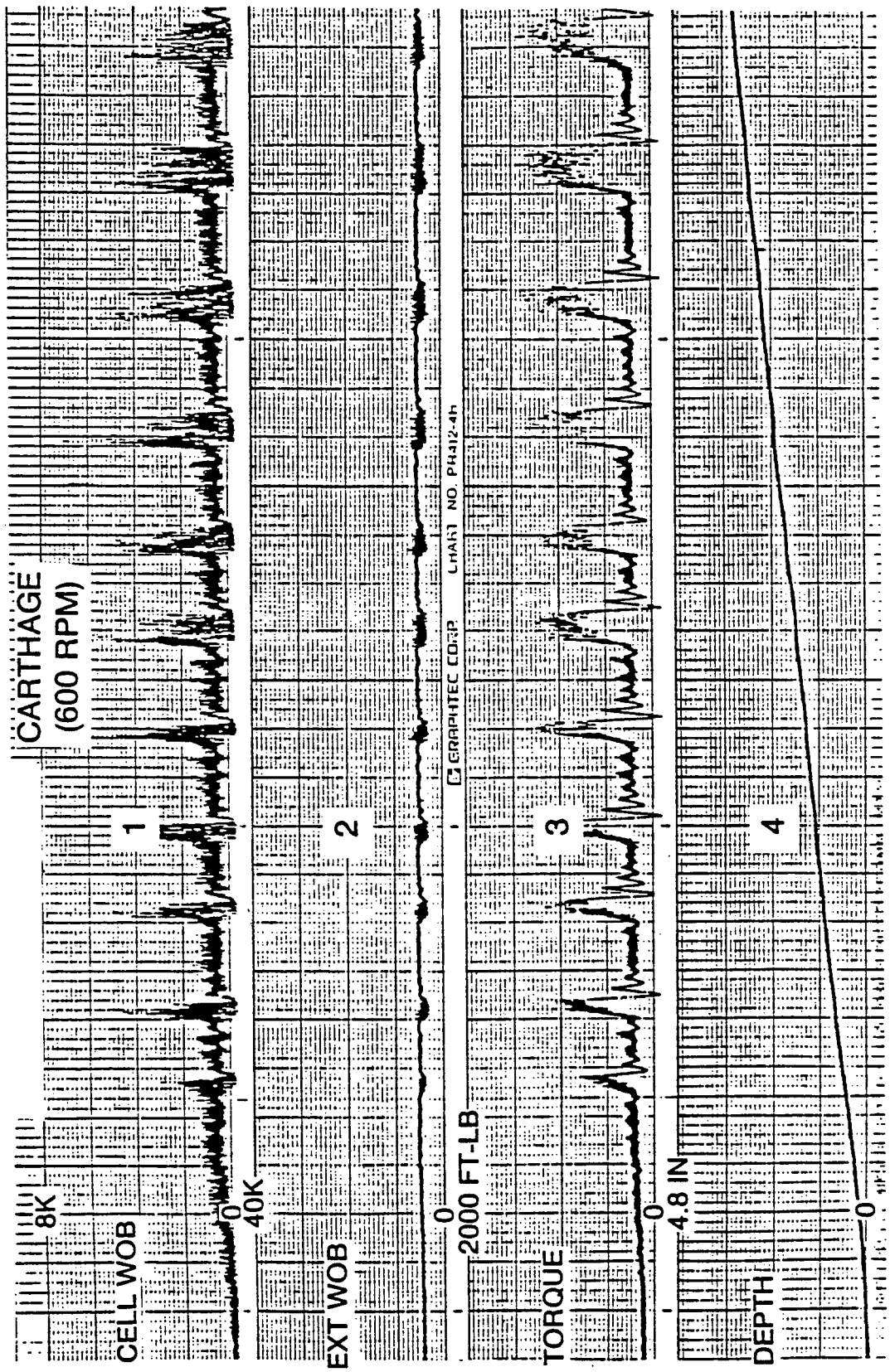
FIG. 20 is a graphical representation versus time of a torque and vibration output of the drill bit of FIG. 16 drilling through Carthage material at elevated RPM.
Figure 21:
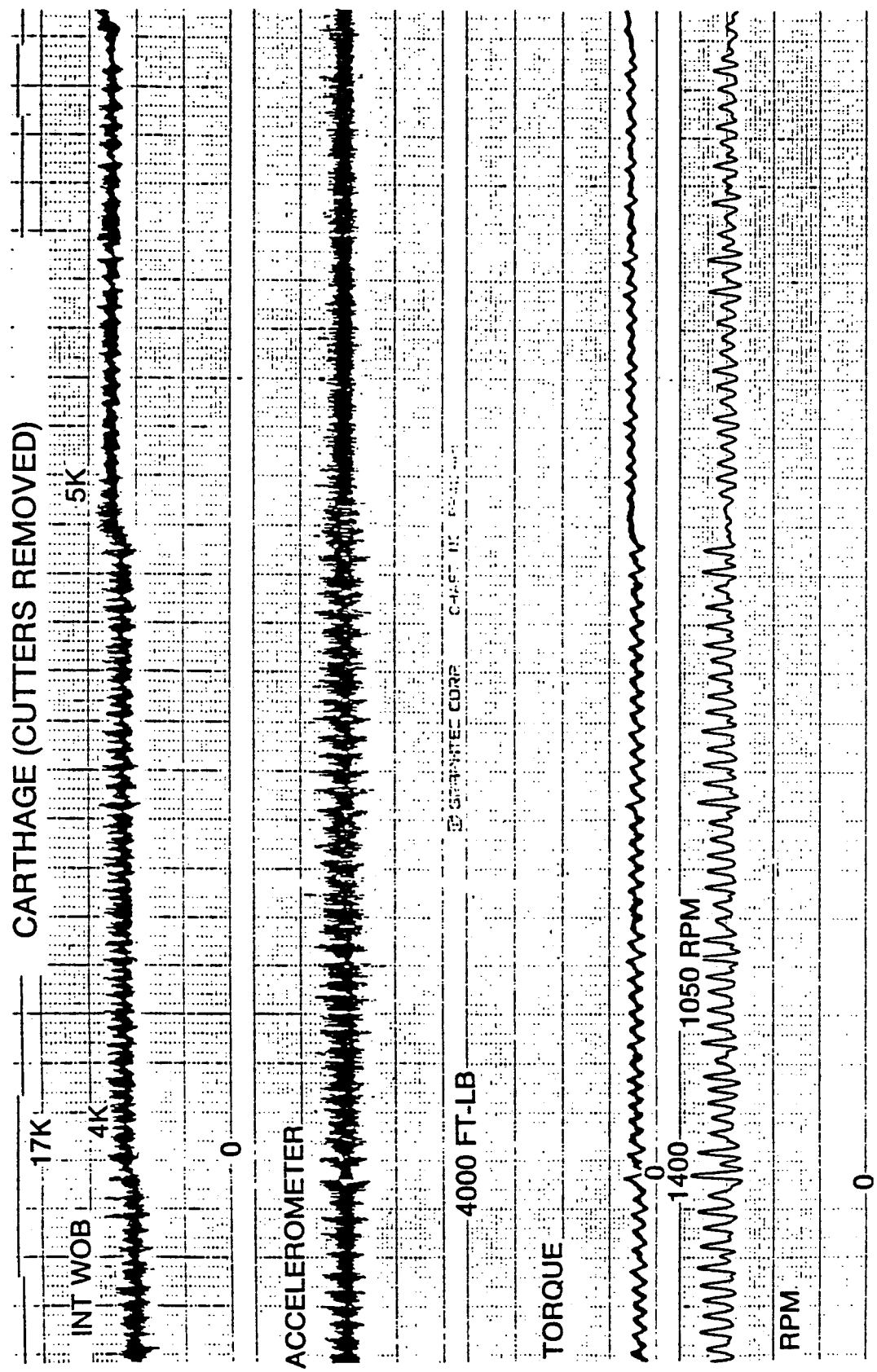
FIG. 21 is a graphical representation versus time of a torque and vibration output of the drill bit of FIG. 16, with cutters removed to define a bearing zone, drilling under the same conditions as that for FIG. 20.

The same PDC drill bit was tested on a turbine drive at high rotational speeds before the cutters were removed. The bottom hole pattern in Carthage showed very definite whirling patterns and FIG. 20 shows the vibration data recorded during these tests. FIG. 21 shows the much reduced vibration data for the drill bit after removing the cutters. Further, the borehole was only ⅛ in. over gauge and there was absolutely no evidence of whirl patterns.

Rock flour was plowed up by rounded carbide wear buttons placed where the cutters were removed on the "low friction" surface. More flour accumulated during the Dolomite test (softer rock) than during the Carthage test. The fact that the rock flour could only be seen on the buttons on the area where the cutters were removed further indicates that the proper location on the bit was selected for cutter removal to provide the low friction bearing zone.

Figure 22:
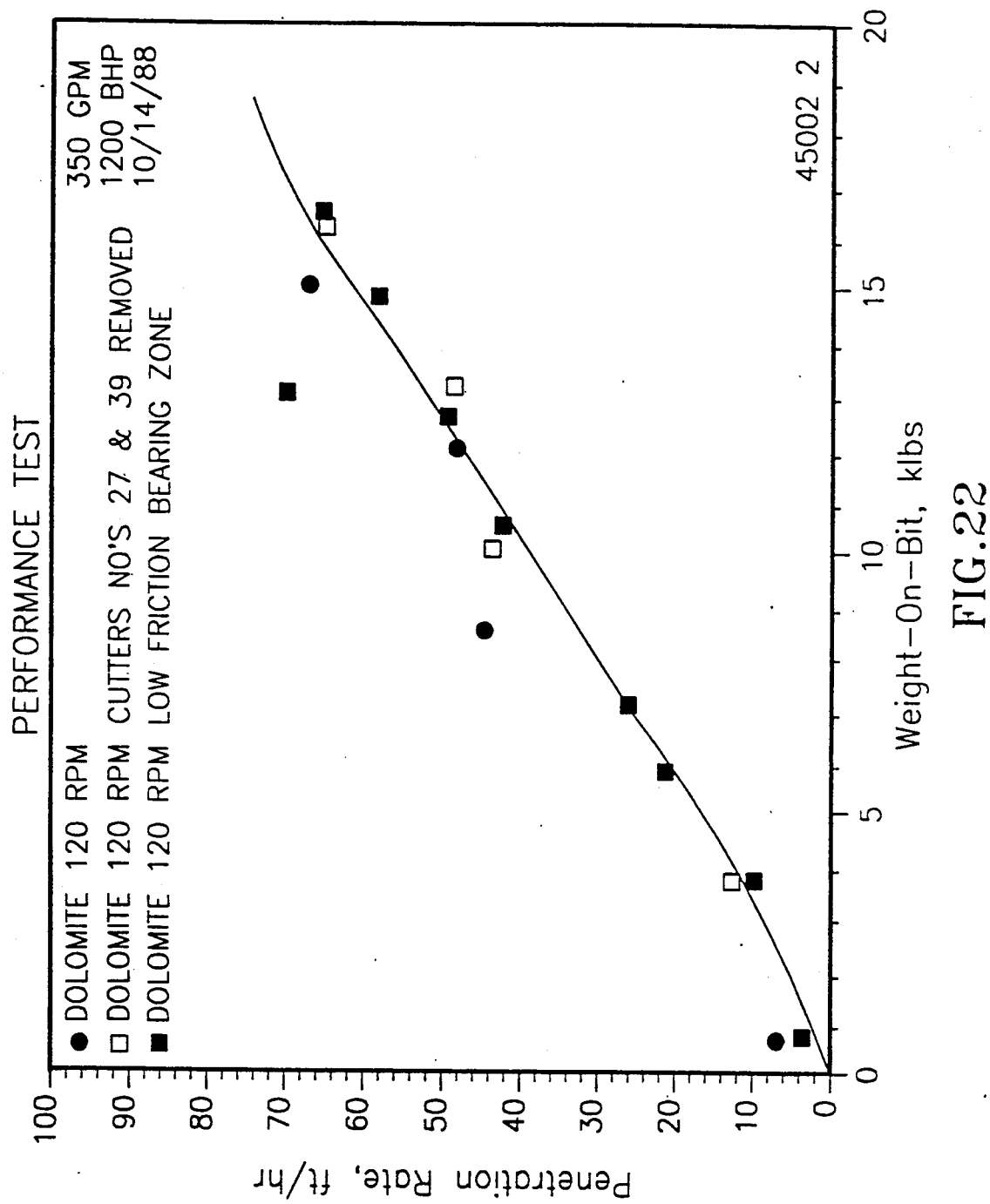
FIGS. 22, 23, and 24 are graphical results of tests of the drill bit of the present invention and an unmodified drill bit to show improvements in rate of penetration (ROP).
Figure 23:
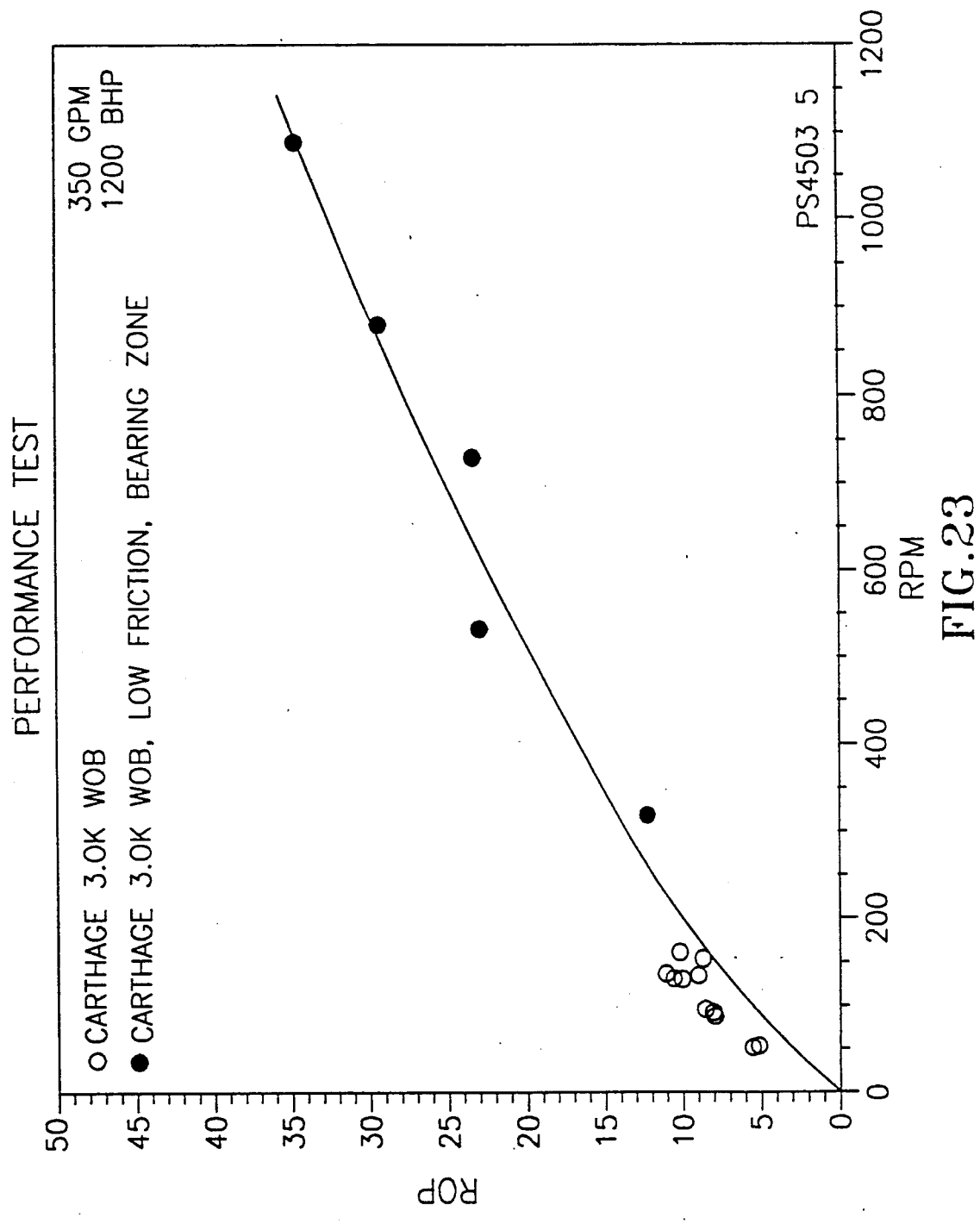

Penetration rates obtained with the PDC drill bit before and after the cutters were removed is not as easy to quantify because normal performance tests could not be run with the drill bit in its original condition because of high vibrations. FIG. 22 shows a comparison of the drill bit in Dolomite at 120 RPM before and after the low friction, bearing zone was formed. The penetration rate is about the same for both conditions, but during the first tests (with no removed cutters) 23 out of 42 cutters were chipped. These chipped cutters may have resulted in a reduced ROP on subsequent tests. FIG. 23 shows two tests in Carthage that indicate the ROP may have been slightly higher before the low friction bearing zone was formed, but the original tests were conducted before the cutters were chipped in Dolomite. By these tests, the low friction bearing zone may not have greatly improved the penetration rate, but it certainly did nothing to hurt it.

Figure 24:
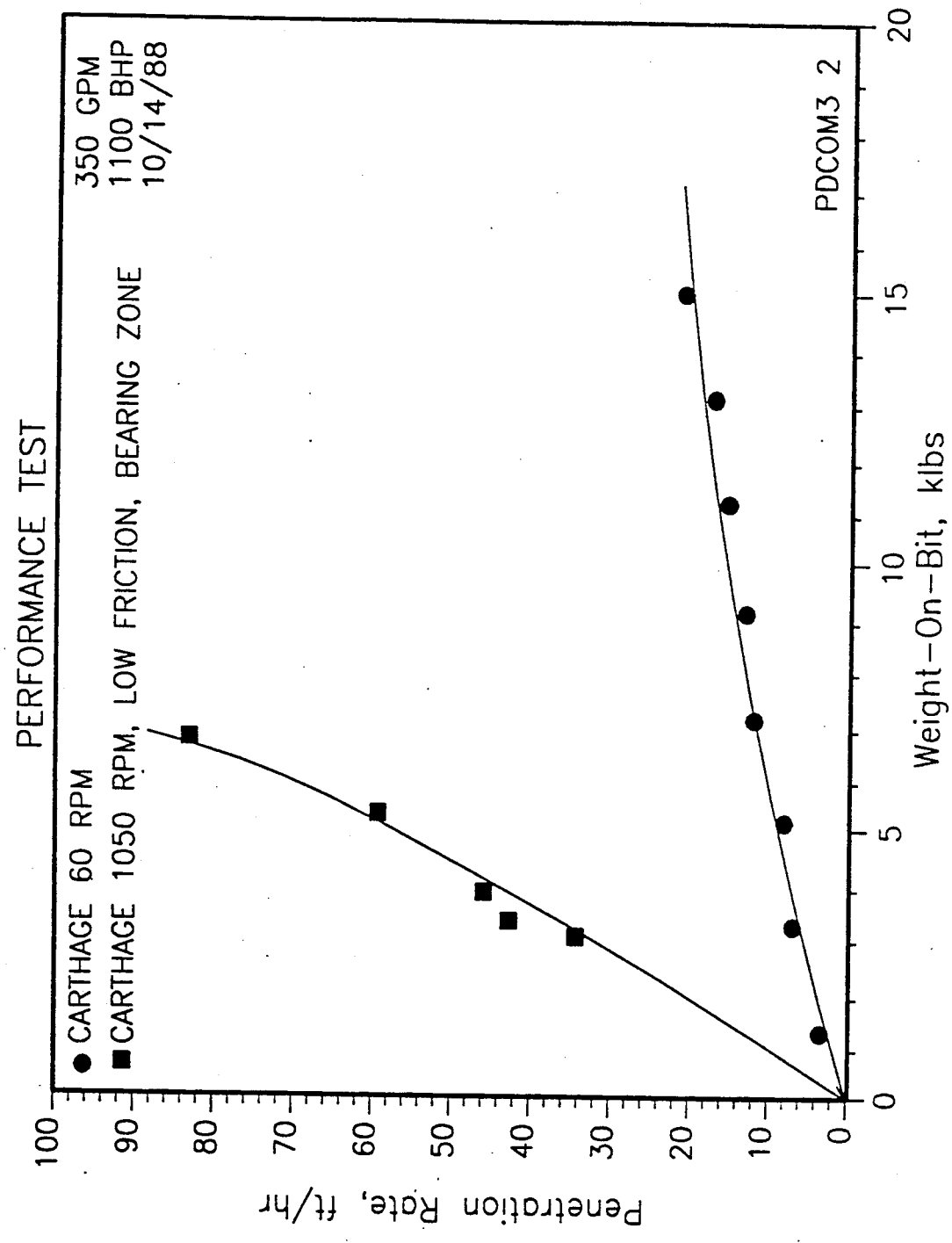

FIG. 24 shows a comparison of the penetration rate obtained at 1050 RPM with the drill bit after the low friction bearing zone was formed compared to the performance at 60 RPM before it was formed. Initially the rpm was limited to 60 RPM because of the high vibrations, but after the bit was modified 1050 RPM could easily be run. In fact the vibrations were lower at 1050 RPM than they were at 60 RPM before the drill bit was modified. The combination of high ROP and low vibrations obtained with the crudely modified drill bit demonstrate the potential of the present concept as a means for providing a very acceptable high speed drill bit that exhibits no destructive whirling.

Whereas the present invention has been described in relation to the drawings attached hereto, it should be understood that other and further modifications, apart from those shown or suggested herein, may be made within the scope and spirit of the present invention.

What is claimed is:

1. A subterranean drill bit operable with a rotational drive source for drilling in subterranean earthen materials to create a borehole having a borehole wall, the drill bit comprising:
   a drill bit body having,
   a shank portion disposed about a longitudinal bit axis for receiving the rotational drive source,
   a gauge portion disposed about the longitudinal bit axis and extending from the shank portion, and
   a face portion disposed about the longitudinal bit axis and extending from the gauge portion;
   a plurality of diamond cutting elements fixedly disposed on and projecting from the face portion and spaced from one another, the cutting elements being positioned for creating a net radial imbalance force during the drilling along a net radial imbalance force vector approximately perpendicular to the longitudinal bit axis;
   a substantially continuous cutter devoid region disposed on the gauge portion and intersecting a plane formed by the longitudinal bit axis and the net radial imbalance force vector; and
   a substantially smooth wear resistant sliding surface disposed in the cutter devoid region about the plane for slidably contacting the borehole wall during the drilling, the net radial imbalance force vector being of sufficient magnitude to substantially maintain the sliding surface in contact with the borehole wall.

2. A subterranean drill bit of claim 1 wherein the cutting elements are formed from poly-crystalline diamond compact.

3. A subterranean drill bit of claim 1, further including a plurality of secondary gauge cutting elements fixedly disposed on and projecting from the gauge portion.

4. A subterranean drill bit of claim 1 wherein the sliding surface is of sufficient surface area so that the magnitude of the net radial imbalance force acting on the sliding surface is less than the compressive strength of the subterranean earthen materials.

5. A subterranean drill bit of claim 1 wherein the sliding surface includes means for reducing wear on the sliding surface during the drilling.

6. A subterranean drill bit operable with a rotational drive source for drilling in subterranean earthen materials to create a borehole having a borehole wall, the drill bit comprising:
   a drill bit body having,
      a shank portion disposed about a longitudinal bit axis for receiving the rotational drive source,
      a gauge portion disposed about the longitudinal bit axis and extending from the shank portion, and
      a face portion disposed about the longitudinal bit axis and extending from the gauge portion;
   a plurality of first cutting elements fixedly disposed on and projecting from the face portion and spaced from one another;
   a plurality of second cutting elements, spaced from the face portion, fixedly disposed on and projecting from the gauge portion and spaced from one another;
   a first and second cutting elements being positioned for creating a net radial imbalance force during the drilling along a net radial imbalance force vector approximately perpendicular to the longitudinal bit axis;
   a substantially continuous cutter devoid region disposed on the gauge portion and intersecting a plane formed by the longitudinal bit axis and the net radial imbalance force vector; and
   a substantially smooth sliding surface, disposed in the cutter devoid region about the plane, for slidably contacting the borehole wall during the drilling, the net radial imbalance force vector being of sufficient magnitude to substantially maintain the sliding surface in contact with the borehole wall and the sliding surface being of sufficient surface area so that the magnitude of the net radial imbalance force vector acting on the sliding surface is less than the compressive strength of the subterranean earthen materials.

7. A subterranean drill bit of claim 6 wherein a portion of the first cutting elements are positioned in a nonlinear pattern about a radial line on the face portion.

8. A subterranean drill bit of claim 6 wherein the first cutting elements are positioned in a nonuniform pattern on the face portion.

9. The subterranean drill bit of claim 6 wherein the sliding surface comprises a diamond impregnated material.

10. A subterranean drill bit of claim 6 wherein the sliding surface includes a plurality of wear-resistant pads fixedly disposed in the cutter devoid region.

11. A subterranean drill bit of claim 6 wherein the drill bit has a greater mass adjacent the sliding surface than at other portions of the drill bit body, whereby centrifugal forces press the sliding surface against the borehole wall as the drill bit is rotated.

12. A method of drilling in subterranean earthen materials to create a borehole having a borehole wall, the method comprising:
   (a) connecting a subterranean drill bit to a rotational drive source, the drill bit comprising,
      a drill bit body having a shank portion disposed about a longitudinal bit axis for receiving the rotational drive source, a gauge portion disposed about the longitudinal bit axis and extending from the shank portion, and a face portion disposed about the longitudinal bit axis and extending from the gauge portion,
      a plurality of diamond cutting elements fixedly disposed on and projecting from the face portion and spaced from one another, the cutting elements being positioned for creating a net radial imbalance force during drilling along a net radial imbalance force vector approximately perpendicular to the longitudinal bit axis,
      a substantially continuous cutter devoid region disposed on the gauge portion and intersecting a plane formed by the longitudinal bit axis and the net radial imbalance force vector, and
      a substantially smooth wear resistant sliding surface disposed in the cutter devoid region and about the plane;
   (b) lowering the drill bit into the borehole to contact the subterranean earthen materials; and
   (c) rotating the drill bit so that the net radial imbalance force vector is directed toward the sliding surface to substantially maintain the sliding surface in contact with the borehole wall.

* * * * *